United States Patent
Huang et al.

(10) Patent No.: US 11,706,114 B2
(45) Date of Patent: Jul. 18, 2023

(54) NETWORK FLOW MEASUREMENT METHOD, NETWORK MEASUREMENT DEVICE, AND CONTROL PLANE DEVICE

(71) Applicant: Huawei Technologies Co., Ltd., Shenzhen (CN)

(72) Inventors: Yong Huang, Shenzhen (CN); Qun Huang, Hong Kong (CN); Gong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 17/158,586

(22) Filed: Jan. 26, 2021

(65) Prior Publication Data

US 2021/0152454 A1 May 20, 2021

Related U.S. Application Data

(63) Continuation of application No. PCT/CN2019/097092, filed on Jul. 22, 2019.

(30) Foreign Application Priority Data

Jul. 27, 2018 (CN) .......................... 201810844967.6

(51) Int. Cl.
*H04L 43/0876* (2022.01)
(52) U.S. Cl.
CPC ................ *H04L 43/0876* (2013.01)
(58) Field of Classification Search
None
See application file for complete search history.

(56) References Cited

U.S. PATENT DOCUMENTS

| | | | |
|---|---|---|---|
| 2006/0075489 A1 | 4/2006 | Ganguly et al. | |
| 2015/0163104 A1* | 6/2015 | Coster | H04L 43/02 709/224 |
| 2019/0114319 A1* | 4/2019 | Tristan | G06N 20/00 |
| 2019/0260683 A1* | 8/2019 | Hughes | H04L 47/00 |

(Continued)

FOREIGN PATENT DOCUMENTS

| | | |
|---|---|---|
| CN | 101227318 A | 7/2008 |
| CN | 103647670 A | 3/2014 |

(Continued)

OTHER PUBLICATIONS

Li, Y., et al., "FlowRadar: A Better NetFlow for Data Centers," Proceedings of the 13th USENIX Symposium on Networked Systems, Design and Implementation (NSDI 16), Mar. 16-18, 2016, 15 pages.

(Continued)

*Primary Examiner* — June Sison
(74) *Attorney, Agent, or Firm* — Conley Rose, P.C.

(57) ABSTRACT

A network flow measurement method is applicable to a system including a network measurement device and a control plane device. The network flow measurement method includes measuring, by the network measurement device, first data, where the first data includes a first-type data structure, the first-type data structure includes first measurement information of a flow, and the first measurement information corresponds to a bit of a keyword of the flow, and sending, by the network measurement device, the first data to the control plane device.

20 Claims, 6 Drawing Sheets

(56) References Cited

U.S. PATENT DOCUMENTS

2020/0014616 A1* 1/2020 Michael .................. H04L 45/22
2020/0169485 A1* 5/2020 Huang ................ H04L 43/0811
2020/0396320 A1* 12/2020 Clemm .................. H04L 47/00
2021/0006317 A1* 1/2021 Robinson .............. H04L 1/0625

FOREIGN PATENT DOCUMENTS

| CN | 104657450 A | 5/2015 |
| CN | 107566206 A | 1/2018 |

OTHER PUBLICATIONS

Kumar, A., et al., "Data Streaming Algorithms for Efficient and Accurate Estimation of Flow Size Distribution," Sigmetrics/Performance 04, Jun. 12-16, 2004, 12 pages.

* cited by examiner

NETWORK FLOW MEASUREMENT METHOD, NETWORK MEASUREMENT DEVICE, AND CONTROL PLANE DEVICE

CROSS-REFERENCE TO RELATED APPLICATIONS

This application is a continuation of International Patent Application No. PCT/CN2019/097092 filed on Jul. 22, 2019, which claims priority to Chinese Patent Application No. 201810844967.6 filed on Jul. 27, 2018, both of which are hereby incorporated by reference in their entireties.

TECHNICAL FIELD

This application relates to the field of information technologies, and more specifically, to a network flow measurement method, a network measurement device, and a control plane device.

BACKGROUND

Development of big data and artificial intelligence technologies promotes network intelligence. A basis of network intelligence is network-wide full data measurement of a network. However, a network measurement technology needs to meet the following two key requirements. A first requirement is high performance. To be specific, information extraction and statistics need to be performed based on each packet. A second requirement is commonality. To be specific, when a plurality of aspects of measurement data about a network flow is required, a small quantity of common sensors can be used to support a large quantity of measurement objectives.

In other approaches, sketch-based network measurement usually requires different measurement algorithms for different to-be-measured information. When an actual measurement task requires various types of information, a plurality of sketch-based algorithms need to be deployed together. However, simultaneous running of the plurality of sketch-based algorithms causes relatively high processing and storage resource overheads. Consequently, the current network flow measurement method has comparatively poor commonality.

SUMMARY

This application provides a network flow measurement method, a network measurement device, and a control plane device, to perform measurement based on a bit level of a keyword of a flow and record measurement information, thereby achieving commonality of network flow measurement.

According to a first aspect, an embodiment of this application provides a network flow measurement method, where the method is applicable to a system including a network measurement device and a control plane device. The method includes measuring, by the network measurement device, first data, where the first data includes a first-type data structure, the first-type data structure includes first measurement information, and the first measurement information corresponds to a bit of a keyword of the flow, and sending, by the network measurement device, the first data to the control plane device.

In this technical solution of this embodiment of this application, the network measurement device measures flow data by using the first-type data structure that is included in the first data and that corresponds to a bit level of the keyword of the flow, and reports, to the control plane device, measurement information recorded based on the first data. In this way, measurement of various types of target traffic, such as a large flow, a flow of any size, and a flow burst, can be supported based on a common measurement method, without being affected by a flow distribution, thereby implementing application of using a single sensor to support comparatively wide network flow measurement.

With reference to the first aspect, in some implementations of the first aspect, the first-type data structure includes measurement information corresponding to at least one bit of the keyword of the flow.

For example, in this embodiment of this application, when a keyword corresponding to a flow has four bits, the first-type data structure may include measurement information corresponding to three bits or two bits of the four bits of the keyword of the flow. That is, the first-type data structure may include measurement information corresponding to some of the bits of the keyword.

With reference to the first aspect, in some implementations of the first aspect, the first data further includes a second-type data structure, and the second-type data structure includes second measurement information of the flow.

In this technical solution of this embodiment of this application, the first data may further include the second-type data structure. The second-type data structure may record the entire keyword of the flow. The first-type data structure and the second-type data structure constitute a data structure used by the network measurement device to measure flow data.

With reference to the first aspect, in some implementations of the first aspect, the first-type data structure includes measurement information corresponding to each bit of the keyword.

For example, in this embodiment of this application, when a keyword corresponding to a flow has four bits, the first-type data structure may include measurement information corresponding to the four bits of the keyword of the flow. That is, the first-type data structure may include the measurement information corresponding to the four bits of the keyword.

With reference to the first aspect, in some implementations of the first aspect, the first-type data structure is K first data unit matrices. Each first data unit matrix is used to record the first measurement information based on a value of one bit of the keyword of the flow. The second-type data structure is a second data unit matrix. The second data unit matrix is used to record the second measurement information. K is a positive integer greater than or equal to 1.

It should be understood that each of the K first data unit matrices corresponds to one bit of the keyword of the flow.

For example, when a keyword of a flow has four bits, there are four first data unit matrices corresponding to the keyword of the flow. To be specific, a first bit of the keyword corresponds to a $1^{st}$ first data unit matrix, a second bit of the keyword corresponds to a $2^{nd}$ first data unit matrix, a third bit corresponds to a $3^{rd}$ first data unit matrix, and a fourth bit corresponds to a $4^{th}$ first data unit matrix.

It should be understood that a data unit matrix may be a data structure including r rows and c columns, where the data unit matrix includes r*c data units.

In this technical solution of this embodiment of this application, a quantity of first matrix units of the first-type data structure is related to a quantity of bits of the keyword corresponding to the flow. When the keyword corresponding to the flow includes K bits, the first-type data structure may include one to K first data unit matrices. In this case, a $1^{st}$ first data unit matrix records measurement information in correspondence to a first bit of the keyword corresponding to the flow, and a $K^{th}$ first data unit matrix records measurement information in correspondence to a first bit of the keyword corresponding to the flow. The second-type data unit structure includes one second data unit matrix. The second data unit matrix records measurement information based on the keyword corresponding to the flow. To be specific, the second data unit matrix records measurement information based on the entire keyword corresponding to the flow.

It should be understood that, in this embodiment of this application, the measurement information may be a packet quantity, a packet length, or a parameter related to a packet attribute.

With reference to the first aspect, in some implementations of the first aspect, the method further includes recording, by the network measurement device, the second measurement information of a first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the second measurement information includes at least one of a packet quantity or a packet length of the first flow, and when a value of an $N^{th}$ bit of the keyword of the first flow is a preset value, recording, by the measurement device, the first measurement information of the first flow in an $M_{ij}$ in an $N^{th}$ data unit matrix of the first-type data structure, where the first measurement information includes at least one of the packet quantity or the packet length of the first flow, N is less than or equal to K, and both K and N are positive integers.

With reference to the first aspect, in some implementations of the first aspect, the preset value is 1.

With reference to the first aspect, in some implementations of the first aspect, the method further includes recording, by the network measurement device, a statistical value of the first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length, and when a value of an $N^{th}$ bit of the keyword of the first flow is a preset value, recording, by the measurement device, a statistical value of the first flow in an $M_{ij}$ in an $N^{th}$ data unit matrix of the first-type data structure, where N is less than or equal to K, and both K and N are positive integers. For example, the network measurement device records a statistical value of the first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. When a value of an $N^{th}$ bit of the keyword of the first flow is 1, the measurement device records a statistical value of the first flow in an $M_{ij}$ in an $N^{th}$ data unit matrix of the first-type data structure, where N is less than or equal to K, and both K and N are positive integers.

For example, the network measurement device records a statistical value of the first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. When a value of an $N^{th}$ bit of the keyword of the first flow is 0, the measurement device records a statistical value of the first flow in an $M_{ij}$ in an $N^{th}$ data unit matrix of the first-type data structure, where N is less than or equal to K, and both K and N are positive integers.

It should be noted that a location of a data unit that is of the first-type data structure and that records a statistical value of the first flow based on a bit of the keyword corresponding to the flow is the same as a location of a data unit that is of the second-type data structure and that records a statistical value of the first flow based on the entire keyword corresponding to the flow.

For example, the second-type data structure is the second data unit matrix. When a statistical value corresponding to the keyword of the first flow is recorded in an $i^{th}$ row and a $j^{th}$ column of the second data unit matrix, a statistical value corresponding to a bit of the keyword of the first flow is recorded in an $i^{th}$ row and a $j^{th}$ column of the K first data unit matrices.

With reference to the first aspect, in some implementations of the first aspect, there is a mapping relationship between the first flow and the $M_{ij}$. The mapping relationship is $h_i(key)=j$, where $h_i( )$ represents an $i^{th}$ hash function, and key represents the keyword corresponding to the first flow.

In this technical solution of this embodiment of this application, there is the mapping relationship between the first flow and the data unit $M_{ij}$ that records the statistical value of the first flow. To be specific, $h_i(key)=j$, where $h_i(x)$ represents an $i^{th}$ hash function. Further, the $M_{ij}$ may record a statistical value of a plurality of flows. The plurality of flows have a common characteristic. To be specific, the plurality of flows are indexed to a same data unit in a data unit matrix based on a hash value by using a same hash function.

According to a second aspect, an embodiment of this application provides a network flow measurement method. The method is applicable to a system including a network measurement device and a control plane device. The method includes obtaining, by the control plane device, first data reported by the network measurement device, where the first data includes a first-type data structure, the first-type data structure includes first measurement information, and the first measurement information corresponds to a bit of a keyword of the flow, and obtaining, by the control plane device, a statistical result based on the first data.

In this embodiment of this application, the control plane device receives measurement information reported by the network measurement device. The network measurement device measures flow data by using the first-type data structure that is included in the first data and that corresponds to a bit level of the keyword of the flow, and reports, to the control plane device, the measurement information recorded based on the first data. The control plane device obtains the statistical result based on a probability distribution characteristic of the first data. In this way, measurement of various types of target traffic, such as a large flow, a flow of any size, and a flow burst, can be supported based on a common measurement method, without being affected by a flow distribution, thereby implementing application of using a single sensor to support comparatively wide network flow measurement.

With reference to the second aspect, in some implementations of the second aspect, the first-type data structure includes measurement information corresponding to at least one bit of the keyword of the flow.

For example, in this embodiment of this application, when a keyword corresponding to a flow has four bits, the first-type data structure may include measurement information corresponding to three bits or two bits of the four bits of the keyword of the flow. That is, the first-type data structure may include measurement information corresponding to some of the bits of the keyword.

With reference to the second aspect, in some implementations of the second aspect, the first data further includes a second-type data structure, and the second-type data structure includes measurement information corresponding to the keyword of the flow.

With reference to the second aspect, in some implementations of the second aspect, the first data further includes a second-type data structure, the second-type data structure includes second measurement information of the flow, and the second measurement information corresponds to the keyword of the flow.

In this technical solution of this embodiment of this application, the first data may further include the second-type data structure. The second-type data structure may record the entire keyword of the flow. The first-type data structure and the second-type data structure constitute a data structure used by the network measurement device to measure flow data.

With reference to the second aspect, in some implementations of the second aspect, the first measurement information corresponds to each bit of the keyword of the flow.

With reference to the second aspect, in some implementations of the second aspect, the first-type data structure includes measurement information corresponding to each bit of the keyword.

For example, in this embodiment of this application, when a keyword corresponding to a flow has four bits, the first-type data structure may include measurement information corresponding to the four bits of the keyword of the flow. That is, the first-type data structure may include the measurement information corresponding to the four bits of the keyword.

With reference to the second aspect, in some implementations of the second aspect, the first-type data structure is K first data unit matrices. Each first data unit matrix is used to record the first measurement information based on a value of a bit of the keyword of the flow. The second-type data structure is a second data unit matrix. The second data unit matrix is used to record the second measurement information. K is a positive integer greater than or equal to 1.

In this technical solution of this embodiment of this application, a quantity of first matrix units of the first-type data structure is related to a quantity of bits of the keyword corresponding to the flow. When the keyword corresponding to the flow includes K bits, the first-type data structure may include one to K first data unit matrices. In this case, a $1^{st}$ first data unit matrix records measurement information in correspondence to a first bit of the keyword corresponding to the flow, and a $K^{th}$ first data unit matrix records measurement information in correspondence to a first bit of the keyword corresponding to the flow. The second-type data unit structure includes one second data unit matrix. The second data unit matrix records measurement information based on the keyword corresponding to the flow. That is, the second data unit matrix records measurement information based on the entire keyword corresponding to the flow.

It should be understood that, in this embodiment of this application, the measurement information may be a packet quantity, a packet length, or a parameter related to a packet attribute.

With reference to the second aspect, in some implementations of the second aspect, an $M_{ij}$ in the second-type data structure is used to record the second measurement information of a first flow, where the $M_{ij}$ represents a data unit in an $i^{th}$ row and a $j^{th}$ column, i is a positive integer less than or equal to r, j is a positive integer less than or equal to c, and the second measurement information includes at least one of a packet quantity or a packet length of the first flow.

The first-type data structure is the K first data unit matrices, where an $M_{ij}$ in an $N^{th}$ data unit matrix is used to, when a value of an $N^{th}$ bit of the keyword of the first flow is a preset value, record the first measurement information of the first flow. The second measurement information includes at least one of the packet quantity or the packet length of the first flow. N is less than or equal to K, and N is a positive integer. For example, the first measurement information and the second measurement information may be statistical values.

With reference to the second aspect, in some implementations of the second aspect, an $M_{ij}$ in the second-type data structure is used to record a statistical value of the first flow, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. The first-type data structure is the K first data unit matrices, where an $M_{ij}$ in an $N^{th}$ data unit matrix is used to, when a value of an $N^{th}$ bit of the keyword of the first flow is a preset value, record a statistical value of the first flow, N is less than or equal to K, and both K and N are positive integers.

For example, an $M_{ij}$ in the second-type data structure is used to record a statistical value of the first flow, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. The first-type data structure is the K first data unit matrices, where an $M_{ij}$ in an $N^{th}$ data unit matrix is used to, when a value of an $N^{th}$ bit of the keyword of the first flow is 1, record a statistical value of the first flow, N is less than or equal to K, and both K and N are positive integers.

For example, an $M_{ij}$ in the second-type data structure is used to record a statistical value of the first flow, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. The first-type data structure is the K first data unit matrices, where an $M_{ij}$ in an $N^{th}$ data unit matrix is used to, when a value of an $N^{th}$ bit of the keyword of the first flow is 0, record a statistical value of the first flow, N is less than or equal to K, and both K and N are positive integers.

With reference to the second aspect, in some implementations of the second aspect, there is a mapping relationship between the first flow and the $M_{ij}$. The mapping relationship is $h_i(key)=j$, where $h_i(\ )$ represents an $i^{th}$ hash function, and key represents the keyword corresponding to the first flow.

In this technical solution of this embodiment of this application, there is the mapping relationship between the first flow and the data unit $M_{ij}$ that records the statistical value of the first flow. To be specific, $h_i(key)=j$, where $h_i(x)$ represents an $i^{th}$ hash function. Further, the $M_{ij}$ may record a statistical value of a plurality of flows. The plurality of flows have a common characteristic. To be specific, the plurality of flows are indexed to a same data unit in a data unit matrix based on a hash value by using a same hash function.

With reference to the second aspect, in some implementations of the second aspect, the obtaining, by the control plane device, a statistical result based on the first data includes obtaining, by the control plane device based on a per-bit distribution characteristic of the keyword, a first set and updated first data, where the first set includes a large flow extracted from r*c stacks stack of the first data, the updated first data includes all data units corresponding to a residual flow that is in the r*c stacks stack other than the first set, and any one of the r*c stacks is a data unit group including data units in same rows and same columns of K+1 data unit matrices.

It should be understood that, in the K+1 data unit matrices, flows having a same hash collision may be together recorded in same rows and same columns. Such K+1 data units may be referred to as a stack (stack). (i, j) may be used to represent a data unit group, that is, a stack stack, including data units in $i^{th}$ rows and $j^{th}$ columns of the K+1 data unit matrices. In this way, the first data may include r*c stacks stack.

With reference to the second aspect, in some implementations of the second aspect, the obtaining, by the control plane device based on a per-bit distribution characteristic of the keyword, a first set and updated first data includes extracting, by the control plane device, a large flow from a first stack of the r*c stacks stack, where the first set includes the large flow extracted from the first stack, the updated first data includes all data units corresponding to a residual flow, other than the large flow extracted from the first stack, in the r*c stacks stack.

With reference to the second aspect, in some implementations of the second aspect, the method further includes, if the updated first data follows a normal distribution, determining that the first set includes all large flows that are in the first data.

In this embodiment of this application, according to a theorem that for any stack (i, j) and a level k, a probability distribution of the stack (i, j) follows a normal distribution when the stack (i, j) includes no large flow, it can be learned that a probability distribution of the updated first data follows a normal distribution when the updated first data includes no large flow.

With reference to the second aspect, in some implementations of the second aspect, the method further includes, if the updated first data does not follow a normal distribution, extracting a large flow from the r*c stacks stack of the first data.

In this embodiment of this application, according to a theorem that for any stack (i, j) and a level k, a probability distribution of the stack (i, j) follows a normal distribution when the stack (i, j) includes no large flow, it can be learned that when a probability distribution of the updated first data does not follow a normal distribution, it indicates that the updated first data still includes a large flow. In this case, it is necessary to continue to extract a large flow from the updated first data.

With reference to the second aspect, in some implementations of the second aspect, the method further includes, when the first set is an empty set, extracting a large flow from the r*c stacks stack of the first data after adjusting a threshold. The threshold is a ratio of large flow traffic to total traffic, or a ratio of a large flow frequency to a total traffic frequency.

For example, the threshold may represent a minimum ratio of large flow traffic to total traffic, or a minimum ratio of a large flow frequency to a total traffic frequency.

With reference to the second aspect, in some implementations of the second aspect, the extracting a large flow from the r*c stacks stack of the first data after adjusting a threshold includes obtaining a probability of a value being 1 corresponding to a bit in the r*c stacks stack, determining a third set based on the probability, where the third set includes a candidate keyword of the large flow, and determining a keyword of the large flow based on the third set.

With reference to the second aspect, in some implementations of the second aspect, the determining a keyword of the large flow based on the third set includes determining K frequencies based on a per-bit ratio of a stack of the first-type data structure to a same stack of the second-type data structure, to calculate a frequency of at least one keyword included in the third set, performing filtering on the at least one keyword based on a per-bit deterministic probability, to determine the keyword of the large flow, and performing frequency check on the keyword of the large flow according to a hash function.

In this embodiment of this application, a candidate keyword set may be determined based on a probability of a value being 1 corresponding to a bit in a stack stack. For example, before the large flow is extracted, a ratio of a frequency value recorded in a $K^{th}$ first data unit matrix in a stack (i,j) to a frequency value in the second data unit matrix is recorded as $R_{i,j[k]}$. When $L_{i,j[k]} > \theta$ and $1-R_{i,j[k]} > \theta$ (for example, θ is 0.99), it is estimated that a $k^{th}$ bit is either 1 or 0. Otherwise, the $k^{th}$ bit is recorded as *, indicating that the $k^{th}$ bit may be 1 or 0.

With reference to the second aspect, in some implementations of the second aspect, the statistical result includes at least one of a large flow list in the first data, data of a residual flow that is in the first data and that is other than a large flow, or a per-bit flow data frequency distribution in the first data.

With reference to the second aspect, in some implementations of the second aspect, the method further includes receiving, by the control plane device, a traffic query request, and sending, by the control plane device, a query result based on the traffic query request.

For example, a query request obtained by the control plane device may be a query request originated from a third-party application.

According to a third aspect, an embodiment of this application provides a network measurement device. The network measurement device is applicable to a system including the network measurement device and a control plane device. The network measurement device includes a processing module, configured to measure first data, where the first data includes a first-type data structure, the first-type data structure includes first measurement information of a flow, and the first measurement information corresponds to a bit of a keyword of the flow, and a communications module, configured to send the first data to the control plane device.

In this technical solution of this embodiment of this application, the network measurement device measures flow data by using the first-type data structure that is included in the first data and that corresponds to a bit level of the keyword of the flow, and reports, to the control plane device, measurement information recorded based on the first data. In this way, measurement of various types of target traffic, such as a large flow, a flow of any size, and a flow burst, can be supported by using a common measurement method, without being affected by a flow distribution, thereby implementing application of using a single sensor to support comparatively wide network flow measurement.

With reference to the third aspect, in some implementations of the third aspect, the first-type data structure includes measurement information corresponding to at least one bit of the keyword of the flow.

For example, in this embodiment of this application, assuming that a keyword corresponding to a flow has four bits, the first-type data structure may include measurement information corresponding to three bits or two bits of the four bits of the keyword of the flow. That is, the first-type data structure may include measurement information corresponding to some of the bits of the keyword.

With reference to the third aspect, in some implementations of the third aspect, the first data further includes a second-type data structure, the second-type data structure includes second measurement information of the flow, and the second measurement information corresponds to the keyword of the flow.

With reference to the third aspect, in some implementations of the third aspect, the first measurement information corresponds to each bit of the keyword of the flow.

With reference to the third aspect, in some implementations of the third aspect, the first-type data structure includes measurement information corresponding to each bit of the keyword.

With reference to the third aspect, in some implementations of the third aspect, the first-type data structure is K first data unit matrices. Each first data unit matrix is used to record the first measurement information based on a value of one bit of the keyword of the flow. The second-type data structure is a second data unit matrix. The second data unit matrix is used to record the second measurement information. K is a positive integer greater than or equal to 1.

In this technical solution of this embodiment of this application, a quantity of first matrix units of the first-type data structure is related to a quantity of bits of the keyword corresponding to the flow. When the keyword corresponding to the flow includes K bits, the first-type data structure may include one to K first data unit matrices. In this case, a $1^{st}$ first data unit matrix records measurement information in correspondence to a first bit of the keyword corresponding to the flow, and a $K^{th}$ first data unit matrix records measurement information in correspondence to a first bit of the keyword corresponding to the flow. The second-type data unit structure includes one second data unit matrix. The second data unit matrix records measurement information based on the keyword corresponding to the flow. To be specific, the second data unit matrix records measurement information based on the entire keyword corresponding to the flow.

It should be understood that, in this embodiment of this application, the measurement information may be a packet quantity, a packet length, or a parameter related to a packet attribute.

With reference to the third aspect, in some implementations of the third aspect, the processing module is specifically configured to record the first measurement information of a first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the first measurement information includes at least one of a packet quantity or a packet length of the first flow. When a value of an $N^{th}$ bit of the keyword of the first flow is a preset value, the second measurement information of the first flow is recorded in an $M_{ij}$ in an $N^{th}$ data unit matrix of the first-type data structure, where N is less than or equal to K, and N is a positive integer.

For example, the first measurement information and the second measurement information may be statistical values.

With reference to the third aspect, in some implementations of the third aspect, the preset value is 1.

For example, the network measurement device records a statistical value of the first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. When a value of an $N^{th}$ bit of the keyword of the first flow is 1, the measurement device records a statistical value of the first flow in an $M_{ij}$ in an $N^{th}$ data unit matrix of the first-type data structure, where N is less than or equal to K, and both K and N are positive integers.

With reference to the third aspect, in some implementations of the third aspect, the preset value is 0.

For example, the network measurement device records a statistical value of the first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. When a value of an $N^{th}$ bit of the keyword of the first flow is 0, the measurement device records a statistical value of the first flow in an $M_{ij}$ in an $N^{th}$ data unit matrix of the first-type data structure, where N is less than or equal to K, and both K and N are positive integers.

With reference to the third aspect, in some implementations of the third aspect, there is a mapping relationship between the first flow and the $M_{ij}$. The mapping relationship is $h_i(key)=j$, where $h_i(\ )$ represents an $i^{th}$ hash function, and key represents the keyword corresponding to the first flow.

According to a fourth aspect, an embodiment of this application provides a control plane device, where the control plane device is applicable to a system including a network measurement device and the control plane device. The control plane device includes a communications module, configured to obtain first data reported by the network measurement device, where the first data includes a first-type data structure, the first-type data structure includes first measurement information of a flow, and the first measurement information corresponds to a bit of a keyword of the flow, and a processing module, configured to obtain a statistical result based on the first data.

In this embodiment of this application, the control plane device receives measurement information reported by the network measurement device. The network measurement device measures flow data by using the first-type data structure that is included in the first data and that corresponds to a bit level of the keyword of the flow, and reports, to the control plane device, the measurement information recorded based on the first data. The control plane device obtains the statistical result based on a probability distribution characteristic of the first data. In this way, measurement of various types of target traffic, such as a large flow, a flow of any size, and a flow burst, can be supported based on a common measurement method, without being affected by a flow distribution, thereby implementing application of using a single sensor to support comparatively wide network flow measurement.

With reference to the fourth aspect, in some implementations of the fourth aspect, the first-type data structure includes measurement information corresponding to at least one bit of the keyword of the flow.

For example, in this embodiment of this application, assuming that a keyword corresponding to a flow has four bits, the first-type data structure may include measurement information corresponding to three bits or two bits of the four bits of the keyword of the flow. That is, the first-type data structure may include measurement information corresponding to some of the bits of the keyword.

With reference to the fourth aspect, in some implementations of the fourth aspect, the first data further includes a second-type data structure, the second-type data structure includes second measurement information of the flow, and the second measurement information corresponds to the keyword of the flow.

With reference to the fourth aspect, in some implementations of the fourth aspect, the first measurement information corresponds to each bit of the keyword of the flow.

With reference to the fourth aspect, in some implementations of the fourth aspect, the first-type data structure includes measurement information corresponding to each bit of the keyword.

For example, assuming that a keyword corresponding to a flow has five bits, the first-type data structure may include measurement information corresponding to the five bits of the keyword of the flow. That is, the first-type data structure may include the measurement information corresponding to each of the five bits of the keyword.

With reference to the fourth aspect, in some implementations of the fourth aspect, the first-type data structure is K first data unit matrices. Each first data unit matrix is used to record the first measurement information based on a value of one bit of the keyword of the flow. The second-type data structure is a second data unit matrix. The second data unit matrix is used to record the second measurement information. K is a positive integer greater than or equal to 1.

In this technical solution of this embodiment of this application, a quantity of first matrix units of the first-type data structure is related to a quantity of bits of the keyword corresponding to the flow. When the keyword corresponding to the flow includes K bits, the first-type data structure may include one to K first data unit matrices. In this case, a $1^{st}$ first data unit matrix records measurement information in correspondence to a first bit of the keyword corresponding to the flow, and a $K^{th}$ first data unit matrix records measurement information in correspondence to a first bit of the keyword corresponding to the flow. The second-type data unit structure includes one second data unit matrix. The second data unit matrix records measurement information based on the keyword corresponding to the flow. To be specific, the second data unit matrix records measurement information based on the entire keyword corresponding to the flow.

It should be understood that, in this embodiment of this application, the measurement information may be a packet quantity, a packet length, or a parameter related to a packet attribute.

With reference to the fourth aspect, in some implementations of the fourth aspect, an $M_{ij}$ in the second-type data structure is used to record the second measurement information of a first flow, where the $M_{ij}$ represents a data unit in an $i^{th}$ row and a $j^{th}$ column, i is a positive integer less than or equal to r, j is a positive integer less than or equal to c, and the second measurement information includes at least one of a packet quantity or a packet length of the first flow. The first-type data structure is the K first data unit matrices, where an $M_{ij}$ in an $N^{th}$ data unit matrix is used to, when a value of an $N^{th}$ bit of the keyword of the first flow is a preset value, record the first measurement information of the first flow. The first measurement information includes at least one of the packet quantity or the packet length of the first flow. N is less than or equal to K, and N is a positive integer.

With reference to the fourth aspect, in some implementations of the fourth aspect, the preset value is 1.

For example, an $M_{ij}$ in the second-type data structure is used to record a statistical value of the first flow, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. The first-type data structure is the K first data unit matrices, where an $M_{ij}$ in an $N^{th}$ data unit matrix is used to, when a value of an $N^{th}$ bit of the keyword of the first flow is 1, record a statistical value of the first flow, N is less than or equal to K, and both K and N are positive integers.

With reference to the fourth aspect, in some implementations of the fourth aspect, the preset value is 0.

For example, an $M_{ij}$ in the second-type data structure is used to record a statistical value of the first flow, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. The first-type data structure is the K first data unit matrices, where an $M_{ij}$ in an $N^{th}$ data unit matrix is used to, when a value of an $N^{th}$ bit of the keyword of the first flow is 0, record a statistical value of the first flow, N is less than or equal to K, and both K and N are positive integers.

With reference to the fourth aspect, in some implementations of the fourth aspect, there is a mapping relationship between the first flow and the $M_{ij}$. The mapping relationship is $h_i(key)=j$, where $h_i( )$ represents an $i^{th}$ hash function, and key represents the keyword corresponding to the first flow.

In this technical solution of this embodiment of this application, there is the mapping relationship between the first flow and the data unit $M_{ij}$ that records the statistical value of the first flow. To be specific, $h_i(key)=j$, where $h_i(x)$ represents an $i^{th}$ hash function. Further, the $M_{ij}$ may record a statistical value of a plurality of flows. The plurality of flows have a common characteristic. To be specific, the plurality of flows are indexed to a same data unit in a data unit matrix based on a hash value by using a same hash function.

With reference to the fourth aspect, in some implementations of the fourth aspect, the processing module is specially configured to, based on a per-bit distribution characteristic of the keyword, obtain a first set and updated first data, where the first set includes a large flow extracted from r*c stacks stack of the first data, the updated first data includes all data units corresponding to a residual flow that is in the r*c stacks stack other than the first set, and any one of the r*c stacks is a data unit group including data units in same rows and same columns of K+1 data unit matrices.

It should be understood that, in the K+1 data unit matrices, flows having a same hash collision may be together recorded in same rows and same columns. Such K+1 data units may be referred to as a stack (stack). (i, j) may be used to represent a data unit group, that is, a stack stack, including data units in $i^{th}$ rows and $j^{th}$ columns of the K+1 data unit matrices. In this way, the first data may include r*c stacks stack.

With reference to the fourth aspect, in some implementations of the fourth aspect, the processing module is specifically configured to extract a large flow from a first stack of the r*c stacks stack, where the first set includes the large flow extracted from the first stack, the updated first data includes all data units corresponding to a residual flow, other than the large flow extracted from the first stack, in the r*c stacks stack.

With reference to the fourth aspect, in some implementations of the fourth aspect, if the updated first data follows a normal distribution, the processing module is further configured to determine that the first set includes all large flows that are in the first data.

In this embodiment of this application, according to a theorem that for any stack (i, j) and a level k, a probability distribution of the stack (i, j) follows a normal distribution when the stack (i, j) includes no large flow, it can be learned that when a probability distribution of the updated first data does not follow a normal distribution, it indicates that the updated first data still includes a large flow. In this case, it is necessary to continue to extract a large flow from the updated first data.

With reference to the fourth aspect, in some implementations of the fourth aspect, if the updated first data does not follow a normal distribution, the processing module is further configured to extract a large flow from the r*c stacks stack of the first data.

With reference to the fourth aspect, in some implementations of the fourth aspect, when the first set is an empty set, the processing module is specifically configured to extract a large flow from the r*c stacks stack of the first data after adjusting a threshold. The threshold is a ratio of large flow traffic to total traffic, or a ratio of a large flow frequency to a total traffic frequency.

For example, the threshold may represent a minimum ratio of large flow traffic to total traffic, or a minimum ratio of a large flow frequency to a total traffic frequency.

With reference to the fourth aspect, in some implementations of the fourth aspect, the processing module is specifically configured to obtain a probability of a value being 1 corresponding to each bit in the r*c stacks stack, determine a third set based on the probability, where the third set includes a candidate keyword of the large flow, and determine a keyword of the large flow based on the third set.

With reference to the fourth aspect, in some implementations of the fourth aspect, the processing module is specifically configured to determine K frequencies based on a per-bit ratio of a stack of the first-type data structure to a same stack of the second-type data structure, to calculate a frequency of at least one keyword included in the third set, perform filtering on the at least one keyword based on a per-bit deterministic probability, to determine the keyword of the large flow, and perform frequency check on the keyword of the large flow according to a hash function.

In this embodiment of this application, a candidate keyword set may be determined based on a probability of a value being 1 corresponding to each bit in a stack stack. For example, before the large flow is extracted, a ratio of a frequency value recorded in a $K^{th}$ first data unit matrix in a stack (i,j) to a frequency value in the second data unit matrix is recorded as $R_{i,j[k]}$. When $R_{i,j[k]}>\theta$ and $1-R_{i,j[k]}>\theta$ (for example, $\theta$ is 0.99), it is estimated that a $k^{th}$ bit is either 1 or 0. Otherwise, the $k^{th}$ bit is recorded as *, indicating that the $k^{th}$ bit may be 1 or 0.

With reference to the fourth aspect, in some implementations of the fourth aspect, the statistical result includes at least one of a large flow list in the first data, data of a residual flow that is in the first data and that is other than a large flow, or a per-bit flow data frequency distribution in the first data.

With reference to the fourth aspect, in some implementations of the fourth aspect, the communications module is further configured to receive, for the control plane device, a traffic query request, and the processing module is further configured to send a query result based on the traffic query request.

For example, a query request obtained by the control plane device may be a query request originated from a third-party application.

According to a fifth aspect, a network measurement device is provided. The network measurement device includes a memory, configured to store a computer program, and a processor, configured to execute the computer program stored in the memory, so that the apparatus performs the method in any one of the first aspect or the possible implementations of the first aspect.

According to a sixth aspect, an embodiment of this application provides a control plane device. The control plane device includes a memory, configured to store a computer program, and a processor, configured to execute the computer program stored in the memory, so that the apparatus performs the method in any one of the second aspect or the possible implementations of the second aspect.

According to a seventh aspect, a system is provided. The system includes at least one network measurement device in any one of the foregoing aspects or the possible implementations of the foregoing aspects, and the control plane device in any one of the foregoing aspects or the possible implementations of the foregoing aspects.

According to an eighth aspect, an embodiment of this application provides a computer readable storage medium. The computer readable storage medium stores an instruction used to implement the method in any one of the first aspect or the possible implementations of the first aspect.

According to a ninth aspect, an embodiment of this application provides a computer readable storage medium. The computer readable storage medium stores an instruction used to implement the method in any one of the second aspect or the possible implementations of the second aspect.

According to a tenth aspect, this application provides a computer program product including an instruction. When the computer program product is run on a computer, the computer is enabled to perform the method in any one of the first aspect or the possible implementations of the first aspect.

According to an eleventh aspect, this application provides a computer program product including an instruction. When the computer program product is run on a computer, the computer is enabled to perform the method in any one of the second aspect or the possible implementations of the second aspect.

DESCRIPTION OF EMBODIMENTS

The following describes technical solutions of this application with reference to the accompanying drawings.

To facilitate understanding of a network flow measurement method, the following briefly describes some related basic concepts.

Figure 1:
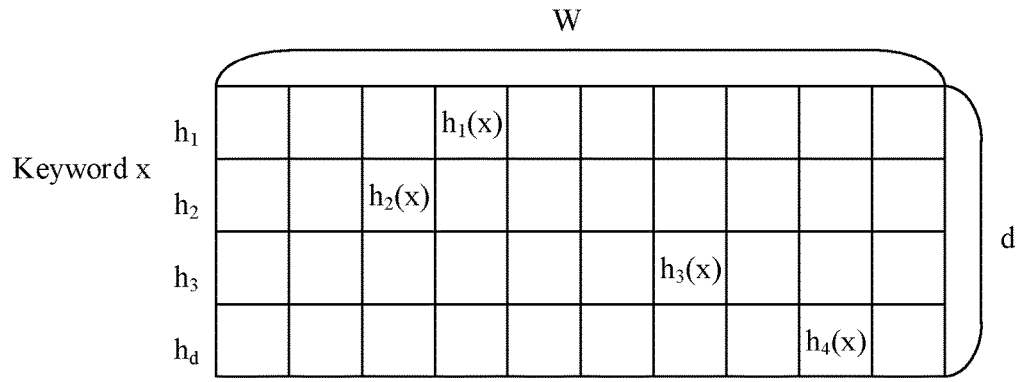
FIG. 1 is a schematic diagram of a data structure according to a sketch-based measurement technology.

A count-min sketch (CMS) technology is a sub linear spatial data structure. FIG. 1 is a schematic diagram of a CMS structure. The CMS includes a two-dimensional array, and each element of the array represents a count value, that is, a count value [1,1], . . . , or a count value [d,w]. Each element of the array is initialized to 0, and d hash functions independent of each other are uniformly and randomly selected. As shown in FIG. 1, a quantity of hash tables used by the CMS is d, and a width of each hash table is w. On each obtained packet, a plurality of hash operations are performed based on a keyword of the packet. In each hash table, a specific hash bucket location is indexed to by using a hash value, so that sizes of packets are accumulatively recorded.

For example, if a size of a specific flow f needs to be queried, several same hash functions are used to locate a plurality of buckets, a bucket with a smallest value is determined from the plurality of buckets, and a value of this bucket is an estimated value of the size of the flow f. It can be theoretically proved that quite high multiflow query precision can be achieved by selecting specific values of w and d.

Flow data generally refers to packet flows having a same 5-tuple (including a source Internet Protocol (IP), a destination IP, a protocol number, a source port, and a destination port).

A large flow is a flow whose traffic exceeds a threshold percentage of total traffic.

A flow burst refers to that a traffic change of a flow exceeds a specific threshold percentage during a specified period.

Flow entropy is calculation based on a flow frequency distribution.

In other approaches, based on the following FlowRadar method, all flows on a link can be detected and sizes of the flows can be recorded. That is, a sensor is deployed in a network device to perform the following algorithm.

Figure 2:
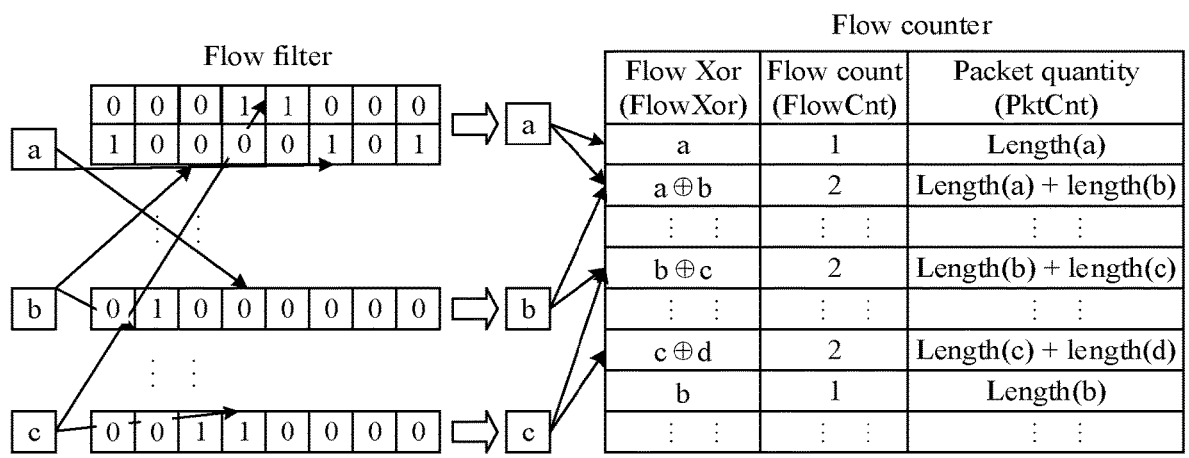
FIG. 2 is a schematic diagram of a method from another approach for recording a flow in a network device.

As shown in FIG. 2, based on a keyword (key) of each flow packet, whether the flow packet is a new data flow or a previously-measured data flow may be measured by first using $K_f$ hash functions and by using a Bloom filter (Flow Filter table).

When all count values in the flow filter table are 1, it indicates that the measured flow is a previously-measured data flow. When any count value in the flow filter table is 0, it indicates that the measured flow is a new data flow, and the count value in a corresponding location is set from 0 to 1.

In a flow counter table, $K_C$ hash functions are used to point to an index record.

For a new data flow FlowCnt+1 && PktCnt+=packet length.

For a previously-measured data flow PktCnt+=packet length.

FlowCnt may represent a count value of a packet quantity, and PktCnt may represent a packet length or a packet quantity. For example, as shown in FIG. 2, for a packet a, a FlowCnt value is 1, and a PktCnt value is size (a).

Based on the foregoing recorded flow counter table, the sensor deployed in the network device periodically sends the recorded flow counter table to a central controller. In the central controller, all flows are restored by using a decoding algorithm according to the FlowRadar.

Figure 3:
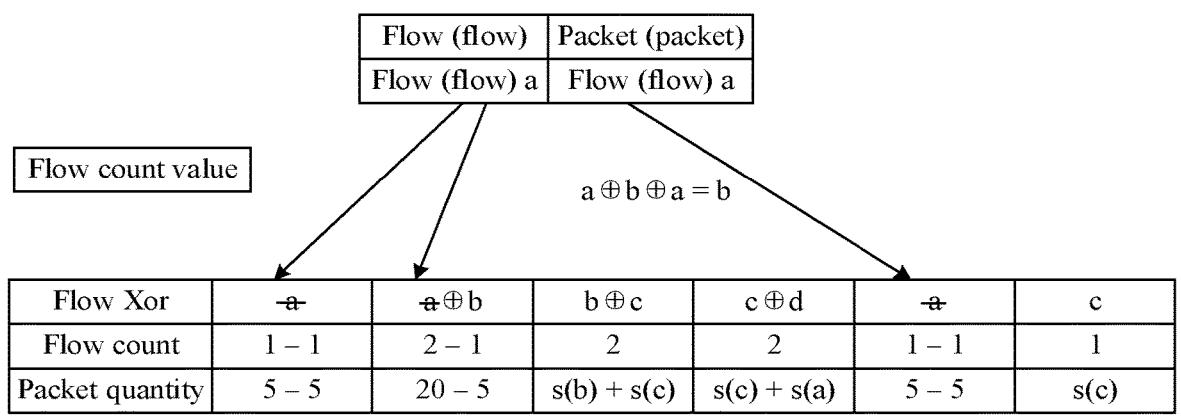
FIG. 3 is a schematic diagram of a method from another approach for restoring a flow in a central controller.

The FlowRadar method for restoring a flow in a central controller is as follows. FIG. 3 is a schematic diagram of a method for restoring a flow in the central controller. As shown in FIG. 3, when restoring a flow, the central controller first finds, from a flow counter table, an entry whose FlowCnt (a count value of the flow) is 1, outputs FlowXor (exclusive OR of the flow) of the entry as a key of the flow, and outputs PacketCnt of the entry as a size of the flow, and performs hashing on the key for $K_c$ times, and deducts Cnts and PktCnts that correspond to remaining locations, so that all flow records can be restored in such a manner of "peeling onions".

However, during decoding, when the central controller FlowRadar finds no entry with a FlowCnt value being 1, the central controller FlowRadar cannot restore a flow based on the foregoing algorithm, resulting in a decoding failure. In addition, a network measurement function implemented by the FlowRadar is mainly specific to information about a flow. Based on this, a flow quantity, a flow burst, a flow distribution, and the like can be queried. However, the FlowRadar cannot very well support common detection functions such as large flow detection. Therefore, the foregoing flow detection method has comparatively poor commonality.

Development of big data and artificial intelligence technologies promotes network intelligence. Network intelligence is based on network-wide full data measurement of a network. A network measurement technology needs to meet the following two key requirements.

A first requirement is high performance. To be specific, information extraction and statistics need to be performed based on each packet.

A network link rate continuously increases and network data flows sharply increase. As a result, currently on a high-speed network link, network traffic measurement has an extremely high requirement for computing and storage resources. On the high-speed link, each packet needs to be processed in seconds, bringing a great challenge to a network traffic measurement technology.

A second requirement is commonality. To be specific, a plurality of aspects of measurement data about a network flow is required.

For example, all flows on a link need to be monitored in real time, large flows and sizes and distributions of flows need to be monitored, whether a traffic burst occurs needs to be detected, and whether any network attack event on a network occurs needs to be detected. It is desirable to use one, two, or another small quantity of common sensors to support a large quantity of measurement objectives.

The network measurement method shown in FIG. 2 and FIG. 3 cannot well meet the second requirement. A large quantity of simple sketch-based algorithms support limited queries.

For example, it is easy to query, by using the foregoing CMS, "whether the size of the flow f exceeds a threshold T". However, for a query of "find out all flows exceeding the threshold T", all possible flows need to be enumerated, but enumerating massive flows is computationally unacceptable.

In addition, a sketch-based measurement technology usually requires different measurement algorithms for different to-be-measured information. When an actual measurement task requires various types of information, a plurality of sketch-based algorithms need to be deployed together. Simultaneous running of the plurality of sketch-based algorithms causes higher processing and storage resource overheads.

In view of this, this application provides a network measurement method and apparatus, so that measurement of various types of target traffic, such as a large flow, a flow of any size, and a flow burst, can be implemented by using a common measurement method and an algorithm in a system, without being affected by a flow distribution, thereby implementing application of using a single sensor to support comparatively wide network flow measurement.

The following describes in detail embodiments of this application with reference to a specific example. It should be noted that the description is merely intended to help a person skilled in the art better understand the embodiments of this application, but is not intended to limit the scope of the embodiments of this application.

Figure 4:
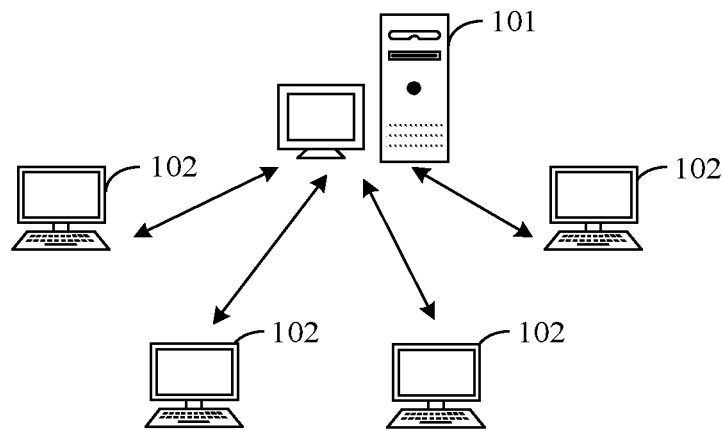
FIG. 4 is a schematic diagram of an implementation in an application scenario according to an embodiment of this application.

FIG. 4 is a schematic diagram of an application scenario according to an embodiment of this application.

As shown in FIG. 4, a system may include a control plane device 101 and a plurality of nodes (for example, network measurement devices) 102. The control plane device 101 is configured to receive measurement data sent by the plurality of nodes 102 in the system, for example, receive first data sent by the plurality of nodes 102.

The node 102 may be a device with a processing function. For example, the node 102 may include any computing device known in other approaches, such as a server or a desktop computer.

The node 102 may include a memory and a processor. The memory may be configured to store program code, for example, an operating system and another application program. The processor may be configured to invoke the program code stored in the memory, to implement a corresponding function of the node. The processor and the memory included in the node may be implemented by using a chip. This is not specifically limited herein.

For example, the system shown in FIG. 4 may include a distributed data plane and a centralized control plane. The control plane device 101 may be considered as a centralized control plane. The plurality of nodes 102 are considered as a distributed data plane.

An operating system and another application program may be installed on the node. For example, a collection module may be deployed on each of the nodes 102. A measurement algorithm is run on the collection module. When a data packet enters the device, the collection module obtains packet information from a forwarding module, and performs the measurement algorithm to update calculation. A result is stored in a data structure. For example, the measurement algorithm may be a multi-sketch algorithm.

The node 102 may periodically report measurement data to the control plane device 101. For example, the collection module periodically reports the data structure to the control plane.

The centralized control plane may include a data integrator, configured to collect data structures from all devices and perform processing to obtain classified data flows.

For example, a large flow and bit-level probability distribution calculation of a keyword of a flow may be obtained, and a list of an obtained large flow, a residual small flow, and bit-level flow distribution data may be output. Various flow statistics, such as a large flow, a flow size, a flow burst, a flow quantity, and a flow distribution, may be queried based on the data.

It should be understood that, in the embodiments of this application, "first", "second", and the like are merely intended to indicate different objects, and represent no other limitation on the indicated objects.

Figure 5:
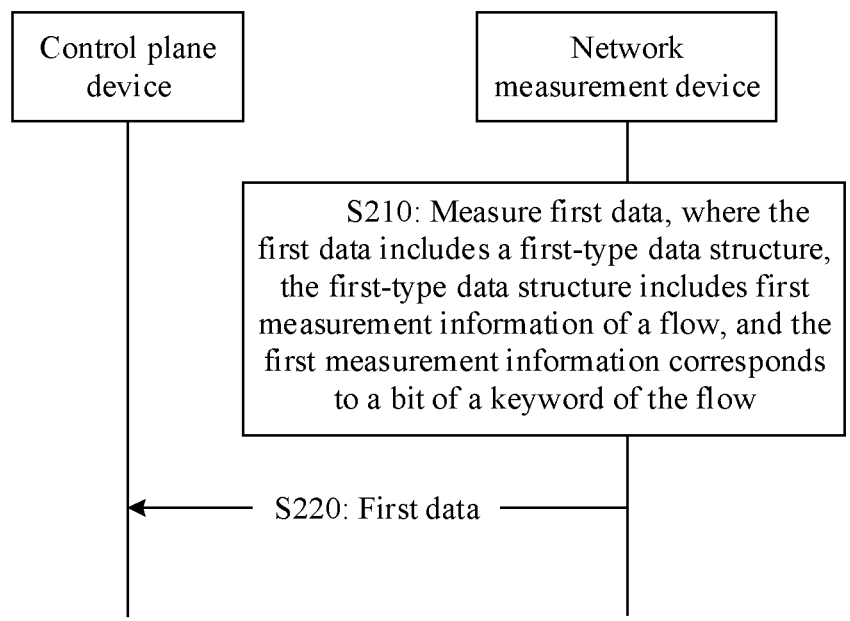
FIG. 5 is an interaction flowchart of a network flow measurement method according to an embodiment of this application.

The following specifically describes, with reference to FIG. 5, a network flow measurement process in a system including a network measurement device and a control panel device according to an embodiment of this application.

FIG. 5 is a schematic flowchart of a network flow measurement method according to an embodiment of this application. The network measurement device may be any one of a plurality of measurement devices in a system, for example, any node in FIG. 4.

In this embodiment of this application, the system may include a plurality of network measurement devices and one control plane device. The control plane device processes measurement data provided by the plurality of network measurement devices, to obtain classified flow data.

S210. The network measurement device measures first data, where the first data includes a first-type data structure, the first-type data structure includes first measurement information, and the first measurement information corresponds to a bit of a keyword of the flow.

Optionally, the first-type data structure may include first measurement information corresponding to at least one bit of the keyword of the flow.

For example, the first-type data structure may include first measurement information corresponding to some bits of the keyword of the flow, or the first-type data structure may include first measurement information corresponding to each bit of the keyword of the flow.

It should be noted that the first data is a data structure constructed based on bit information of the keyword.

For example, when a keyword corresponding to a flow has three bits, the first-type data structure of the first data may include first measurement information corresponding to a first bit of the keyword corresponding to the flow, or the first-type data structure of the first data may include first measurement information corresponding to each of the three bits of the keyword corresponding to the flow. This is not limited in this embodiment of this application.

Optionally, the first data may further include a second-type data structure, and the second-type data structure includes measurement information corresponding to the keyword of the flow. That is, measurement information recorded in the second-type data structure is based on the keyword of the flow.

Optionally, the first data further includes a second-type data structure, the second-type data structure includes second measurement information of the flow, and the second measurement information corresponds to the keyword of the flow.

It should be understood that the first measurement information and the second measurement information may include a packet length of the flow, a flow quantity, and a parameter related to a flow attribute. "First" and "second" are merely intended to indicate different objects, and this is not limited in this application.

It should be understood that the first measurement information is recorded in the first-type data structure based on a bit of the keyword corresponding to the flow, and the second measurement information is recorded in the second-type data structure based on the entire keyword corresponding to the flow.

Figure 6:
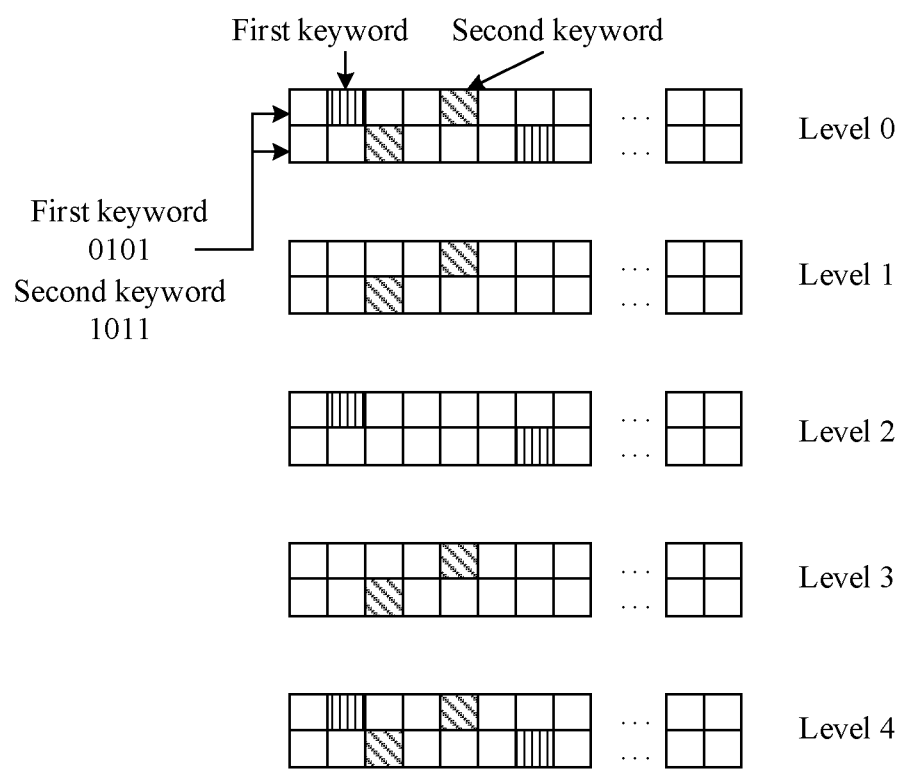
FIG. 6 is a schematic diagram of a data structure in a network flow measurement method according to this application.

For example, FIG. 6 shows an example in which the first data includes the first-type data structure and the second-type data structure, where the first-type data structure may include the first measurement information corresponding to each bit of the keyword, and the second-type data structure may include the second measurement information corresponding to the keyword of the flow.

In this embodiment of this application, a data structure shown in FIG. 6 may be a multi-sketch algorithm. As shown in FIG. 6, assuming that a flow identifier (ID) (for example, a flow keyword (flowkey)) has L bits, L+1 sketch data structures are constructed. Data structures are in one-to-one correspondence with levels. Each sketch data structure may be a data unit matrix with r rows and c columns, where one cell represents one data unit.

Each sketch hashes a keyword of a packet for r times, and each hash function independently and uniformly maps the keyword to space [1 ... c]. Assuming that $V_{i,j}[k]$ represents a value in an $i^{th}$ row and a $j^{th}$ column of a data unit matrix in a $k^{th}$ sketch, the multi-sketch is a procedure shown in FIG. 6.

Optionally, the first-type data structure is K first data unit matrices. Each first data unit matrix is used to record the first measurement information based on a value of one bit of the keyword of the flow. The second-type data structure is a second data unit matrix. The second data unit matrix is used to record the second measurement information. K is a positive integer greater than or equal to 1.

Optionally, the first-type data structure is K first data unit matrices. Each first data unit matrix is used to record measurement information corresponding to one bit of the keyword of the flow. The second-type data structure is a second data unit matrix. The second data unit matrix is used to record the measurement information corresponding to the keyword of the flow.

For example, the first-type data structure may be considered as a data structure of a level 1 to a level L, and is used to record the first measurement information corresponding to one bit of the keyword of the flow. The second-type data structure may be considered as a data structure of a level 0, and is used to record second measurement information corresponding to the entire keyword of the flow. That is, the first-type data structure is the K first data unit matrices, and the second-type data structure is the second data unit matrix. The K first data unit matrices are L data structures.

For example, the first measurement information and the second measurement information may be statistical values.

Optionally, the network measurement device records a statistical value of a first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. When a value of an $N^{th}$ bit of the keyword of the first flow is a preset value, the measurement device records a statistical value of the first flow in an $M_{ij}$ in an $N^{th}$ data unit matrix of the second-type data structure, where N is less than or equal to K, and both K and N are positive integers.

For example, when a value of an $N^{th}$ bit of the keyword of the first flow is 1, the measurement device records a statistical value of the first flow in an $M_{ij}$ in an $N^{th}$ data unit matrix of the second-type data structure, where N is less than or equal to K, and both K and N are positive integers.

For example, when a value of an $N^{th}$ bit of the keyword of the first flow is 0, the measurement device records a statistical value of the first flow in an $M_{ij}$ in an $N^{th}$ data unit matrix of the second-type data structure, where N is less than or equal to K, and both K and N are positive integers.

It should be understood that there is a mapping relationship between the first flow and the $M_{ij}$. Calculation is performed on the keyword of the first flow by using a hash function, so that a unit in a data structure is indexed to by using a hash value. That is, $h_i(key)=j$, where $h_i(\ )$ represents an $i^{th}$ hash function, and key represents the keyword corresponding to the first flow.

For example, statistical values of all keywords may be recorded in a sketch 0. For example, a quantity or a length of all keywords is recorded.

A sketch 1 to a sketch L collect statistics on each value being a preset value corresponding to a bit of the keyword. For example, the preset value may be 1, or the preset value may be 0. This is not limited in this embodiment of this application.

Description is provided by using an example in which the sketch 1 to the sketch L collect statistics on each value being 1 corresponding to a bit of the keyword.

For example, f[k] represents a value of a $k^{th}$ bit of the flow ID. When the $k^{th}$ bit is 1, f[k]=1, or when the $k^{th}$ bit is not 1, f[k]=0.

A data unit of a level k is recorded as follows, for k belonging to [1 ... L], if f[k]=1, a value of $V_{i,j}[k]$ is increased by 1, or otherwise, no operation is performed on the value of $V_{i,j}[k]$.

It should be noted that, for collecting statistics on a flow packet quantity, the value is increased by 1, and for collecting statistics on a flow byte unit size, the value is increased by a packet length value recorded in bytes. Unless otherwise specified, the following provides description in terms of a flow packet quantity, and this statement is not repeated hereinafter.

Specifically, FIG. 6 is a schematic diagram of recording a data unit and is described by using an example in which L=4, there are two keywords with two flow IDs a keyword 1=(0101) and a keyword 2=(1011), and r=2.

Description is provided by using an example in which statistics on a flow packet quantity is collected.

For example, the keyword 1 shown in FIG. 6 is 0101, the hash function is indexed to a first row and a second column of a data unit of a level 0 by using an $h_1$ hash function, and the hash function is indexed to a second row and a seventh column of the data unit of the level 0 by using an $h_2$ hash function. Statistics collection is performed on the keyword bit by bit. For example, a value of a first bit of the keyword 1 is not 1, and therefore no operation is performed on a value of $V_{1,2}[1]$ and a value of $V_{2,7}[1]$. That is, no operation is performed on values in a first row and a second row of a level 1. A value of a second bit of the keyword 1 is 1, and therefore a value of $V_{1,2}[2]$ and a value of $V_{2,7}[2]$ are both increased by 1. That is, an operation is performed on both values in a first row and a second row of a level 2. A value of a third bit of the keyword 1 is not 1, and therefore no operation is performed on a value of $V_{1,2}[3]$ and a value of $V_{2,7}[3]$. That is, no operation is performed on values in a first row and a second row of a level 3. A value of a fourth bit of the keyword 1 is 1, and therefore a value of $V_{1,2}[4]$ and a value of $V_{2,7}[4]$ are both increased by 1. That is, an operation is performed on both values in a first row and a second row of a level 4.

Description is provided by using an example in which statistics on a flow packet length value is collected.

For example, the keyword 1 shown in FIG. 6 is 0101, the hash function is indexed to a first row and a second column of a data unit of a level 0 by using an $h_1$ hash function, and the hash function is indexed to a second row and a seventh column of the data unit of the level 0 by using an $h_2$ hash function. Statistics collection is performed on the keyword bit by bit. For example, a value of a first bit of the keyword 1 is not 1, and therefore no operation is performed on a value of $V_{1,2}[1]$ and a value of $V_{2,7}[1]$. That is, no operation is performed on values in a first row and a second row and a level 1. A value of a second bit of the keyword 1 is 1, and therefore a value of $V_{1,2}[2]$ and a value of $V_{2,7}[2]$ are increased by a packet length value corresponding to the keyword 1. That is, operations are respectively performed on values in a first row and a second row and a level 2. A value of a third bit of the keyword 1 is not 1, and therefore no operation is performed on a value of $V_{1,2}[3]$ and a value of $V_{2,7}[3]$. That is, no operation is performed on values in a first row and a second row and a level 3. A value of a fourth bit of the keyword 1 is 1, and therefore a value of $V_{1,2}[4]$ and a value of $V_{2,7}[4]$ are increased by the packet length value corresponding to the keyword 1. That is, operations are respectively performed on values in a first row and a second row and a level 4.

The foregoing uses the keyword 1 as an example for description. For the keyword 2, a process is similar to the foregoing process, and details are not described herein again.

Description is provided by using an example in which the sketch 1 to the sketch L collect statistics on each value being 0 corresponding to a bit of the keyword.

For example, f[k] represents a value of a $k^{th}$ bit of the flow ID. When the $k^{th}$ bit is 0, f[k]=1, or when the $k^{th}$ bit is not 0, f[k]=0.

A data unit of a level k is recorded as follows, for k belonging to [1 ... L], if f[k]=0, a value of $V_{ij}[k]$ is increased by 1, or otherwise, no operation is performed on the value of $V_{ij}[k]$.

It should be noted that, for collecting statistics on a flow packet quantity, the value is increased by 1, and for collecting statistics on a flow byte unit size, the value is increased by a packet length value recorded in bytes. Unless otherwise specified, the following provides description in terms of a flow packet quantity, and this statement is not repeated hereinafter.

A specific statistical process is similar to the foregoing statistical process performed on each value being 1 corresponding to a bit. Details are not described herein again.

FIG. 6 shows a process in which the network measurement device measures the first data and records a statistical result in a data unit. There may be a plurality of network measurement devices in the system. Each measurement device sends, based on a structure of the first data, measurement information statistics to the control plane device in the system.

S220. The network measurement device sends the first data to the control plane device.

In this embodiment of this application, the control plane device receives the first data sent by the network measurement device, and obtains the statistical result based on the first data.

Optionally, the statistical result may include at least one of a large flow list in the first data, data of a residual flow that is in the first data and that is other than a large flow, or a per-bit flow data frequency distribution in the first data.

It should be understood that various flow statistics may be queried based on the statistical result.

For example, a large flow, a flow size, a flow burst, a flow quantity, a flow distribution, and the like may be queried.

In this embodiment of this application, the first data may include the first-type data structure and the second-type data structure, where the first-type data structure may include the measurement information corresponding to a bit of the keyword. For example, the first-type data structure may include measurement information corresponding to at least one bit of the keyword of the flow, or the first-type data structure may include measurement information corresponding to each bit of the keyword of the flow. The first data may further include the second-type data structure, and the second-type data structure may include the measurement information corresponding to the keyword of the flow.

Optionally, an $M_{ij}$ in the second-type data structure is used to record a statistical value of the first flow, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length.

The first-type data structure is K first data unit matrices, where an $M_{ij}$ in an $N^{th}$ data unit matrix is used to, when a value of an $N^{th}$ bit of the keyword of the first flow is a preset value, record a statistical value of the first flow, N is less than or equal to K, and both K and N are positive integers.

For example, the first-type data structure is K second data unit matrices, where an $M_{ij}$ in an $N^{th}$ data unit matrix is used to, when a value of an $N^{th}$ bit of the keyword of the first flow is 1, record a statistical value of the first flow, N is less than or equal to K, and both K and N are positive integers.

For example, the first-type data structure is K second data unit matrices, where an $M_{ij}$ in an $N^{th}$ data unit matrix is used to, when a value of an $N^{th}$ bit of the keyword of the first flow is 0, record a statistical value of the first flow, N is less than or equal to K, and both K and N are positive integers.

It should be understood that there is a mapping relationship between the first flow and the $M_{ij}$. Calculation is performed on the keyword of the first flow by using a hash function, so that a unit in a data structure is indexed to by using a hash value. That is, $h_i(key)=j$, where $h_i(\ )$ represents an $i^{th}$ hash function, and key represents the keyword corresponding to the first flow.

For example, as shown in FIG. 6, the second-type data structure may be the data structure of the level 0. Assuming that the keyword of the first flow is the keyword 1 shown in FIG. 6, the first-type data structure may be data units of the level 1 to the level 4. An Mij may be represented as a first row and a second column, or a second row and a seventh column, of each data structure. That is, the $M_{ij}$ corresponds to information of a row and a column, where the keyword 1 is recorded, of the data unit of the level 0.

It should be understood that the foregoing is merely an example in which the keyword of the first flow is the keyword 1, and does not constitute any limitation on this embodiment of this application.

The following briefly describes a related theory of an algorithm executed by the control plane device.

It should be understood that the first data includes K+1 unit matrices, that is, the second data unit matrix and the K first data unit matrices. A quantity of the first data unit matrices may be related to a quantity of bits of the keyword of the flow.

For example, the first-type data structure includes measurement information corresponding to each bit of the keyword of the flow. Assuming that a keyword of a flow has three bits, the first data may include three first data unit matrices.

In the K+1 data unit matrices, flows having a same hash collision are recorded in same rows and same columns. Such a group of K+1 data units are referred to as a stack (stack). (i, j) is used to represent a stack in an $i^{th}$ row and a $j^{th}$ column. In this way, there are r*c stacks stack in total. $n_{i,j}$ is used to represent a quantity of flows hashed to (i, j), and n is used to represent a quantity of all observed flows. Therefore, $n = \sum_{j=1}^{c} n_{i,j} (1 \le i \le r)$ p[k] is used to represent a probability that a value of a $k^{th}$ bit is 1.

There are the following two basic assumptions.

Assumption 1 is uniformity of a hash function. Each hash function uniformly disperses a large quantity of flows into a plurality of columns, where $n_{i,j} \approx \frac{n}{c} (1 \le j \le c).$ Assumption 2 is that all hash functions $h_i(f)$ are independent of p[k]. That is, for all $p_{i,j}[k] = p[k] (1 \le i \le r, 1 \le j \le c),$ there is the following theorem.

Theorem 1. For any stack (i, j) and a level k, when the stack (i, j) includes no large flow, $R_{i,j[k]} = V_{i,j[k]} / V_{i,j[0]}$ follows a Gaussian distribution $N(p[k], \sigma^2[k])$, where $\sigma^2[k] = p[k](1-p[k])c/n$.

Theorem 1 requires that there is no large flow in a stack. A basic concept of this embodiment of this application is that, when all large flows are extracted from a multi-level structure, a sketch result constructed by a remaining flow follows the Gaussian distribution.

By using a per-bit relationship between a sketch and the sketch 0, large flows may be analyzed bit by bit, and it may be determined whether iteration is completed by checking whether a remaining sketch follows a Gaussian distribution. This basic concept may be performed on all stacks by using Assumption 2, to extract all large flows.

Based on an extracted large flow and residual sketch data, various network flow statistics, such as a flow list, a flow size, a flow burst, a flow quantity, and a flow distribution, may be queried.

Optionally, that the control plane device obtains the statistical result based on the first data includes the following.

The control plane device obtains, based on a per-bit distribution characteristic of the keyword, a first set and updated first data, where the first set includes a large flow extracted from r*c stacks stack of the first data, the updated first data includes all data units corresponding to a residual flow that is in the r*c stacks stack other than the first set, and any one of the r*c stacks is a data unit group including data units in same rows and same columns of K+1 data unit matrices.

That is, based on a per-bit distribution characteristic (for example, a probability distribution) of the keyword, the control plane device obtains the first set and the updated first data. The control plane device extracts the large flow from all the stacks stack, that is, the r*c stacks stack, of the first data, and records, in the first set, the large flow extracted from all the stacks. Therefore, the updated first data includes all data units corresponding to a residual flow that is in the r*c stacks stack other than the first set.

It should be understood that, when the control plane device extracts a large flow from all the stacks stack, that is, the r*c stacks stack, of the first data, the control plane device may update the first data every time after the control plane device extracts a large flow from all the stacks.

For example, the control plane device extracts a large flow from a first stack, where the first stack is any one of the r*c stacks stack. The first set may include the large flow extracted from the first stack, and the updated first data may include all data units corresponding to a residual flow that is in the r*c stacks stack other than the first set.

That is, the first set may include a large flow that is in the first data, and the updated first data may include a residual flow other than the large flow in the first data.

Optionally, if the updated first data follows a normal distribution, the first set is determined as the large flow.

According to Theorem 1, it can be learned that when a stack includes no large flow, a probability distribution characteristic of the stack follows the Gaussian distribution. That is, if the updated first data follows a normal distribution, it indicates that the updated first data includes no large flow, and this means that the extracted large flow of the first set is a large flow.

Optionally, if the updated first data does not follow a normal distribution, the control plane device extracts a large flow from the r*c stacks stack of the first data.

It should be noted that, if the updated first data does not follow a normal distribution, it indicates that the updated first data may still include a large flow. In this case, the control plane device continues to extract a large flow from all the stacks of the first data. The extracted large flow is recorded in the first set. If the updated first data follows a normal distribution, it may be indicated that all the large flows in the first data are extracted. In this case, the first set is a large flow.

Optionally, if the updated first data does not follow a normal distribution and the first set is an empty set, the control plane device extracts a large flow from the r*c stacks stack of the first data after adjusting a threshold. The threshold is a ratio of large flow traffic to total traffic, or a ratio of a large flow frequency to a total traffic frequency.

It should be noted that the threshold may be θ, where θ represents a parameter for determining a large flow. When a frequency or a size of a flow is f>θN, the flow is referred to as a large flow, where N is a frequency or a size of all flows obtained within an observation time.

According to Theorem 1, it can be learned that when any stack includes no large flow, a probability distribution characteristic of the stack follows the Gaussian distribution. If the updated first data does not follow a normal distribution, it indicates that the updated first data still includes a large flow.

For example, the extracting a large flow from all stacks of the first data, that is, from the r*c stacks stack of the first data, may include obtaining, by the control plane device, a probability of a value being 1 corresponding to each bit in the r*c stacks stack, determining a third set based on the probability, where the third set includes a candidate keyword of the large flow, and determining a keyword of the large flow based on the third set.

Optionally, the determining a keyword of the large flow based on the third set includes determining K frequencies based on a per-bit ratio of a stack of the first-type data structure to a same stack of the second-type data structure, to calculate a frequency of at least one keyword included in the third set, performing filtering on the at least one keyword based on a per-bit deterministic probability, to determine the keyword of the large flow, and performing frequency check on the keyword of the large flow according to a hash function.

Figure 8:
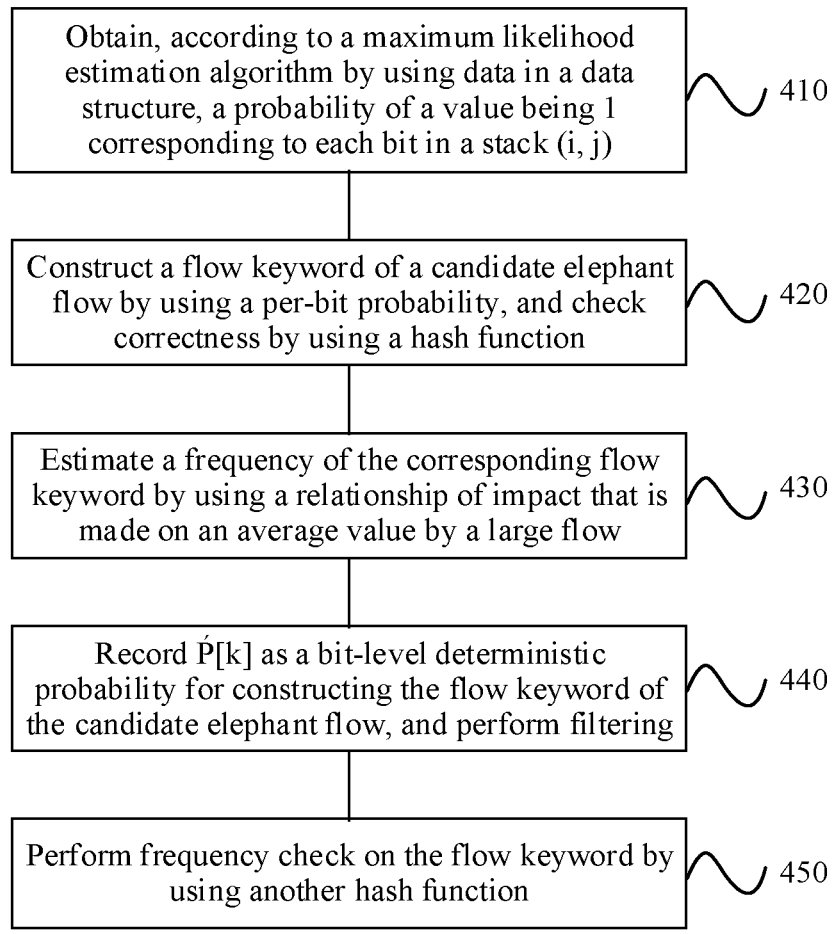
FIG. 8 is a schematic diagram of an algorithm for extracting a large flow from a stack stack by a control plane device according to an embodiment of this application.

It should be noted that, for a specific process of how to extract a large flow from a stack, reference may be made to subsequent descriptions about FIG. 8.

In this embodiment of this application, by using the first-type data structure that is included in the first data and that corresponds to a bit level of the keyword of the flow, measurement of various types of target traffic, such as a large flow, a flow of any size, and a flow burst, can be supported based on a common measurement method, without being affected by a flow distribution, thereby implementing application of using a single sensor to support comparatively wide network flow measurement.

Figure 7:
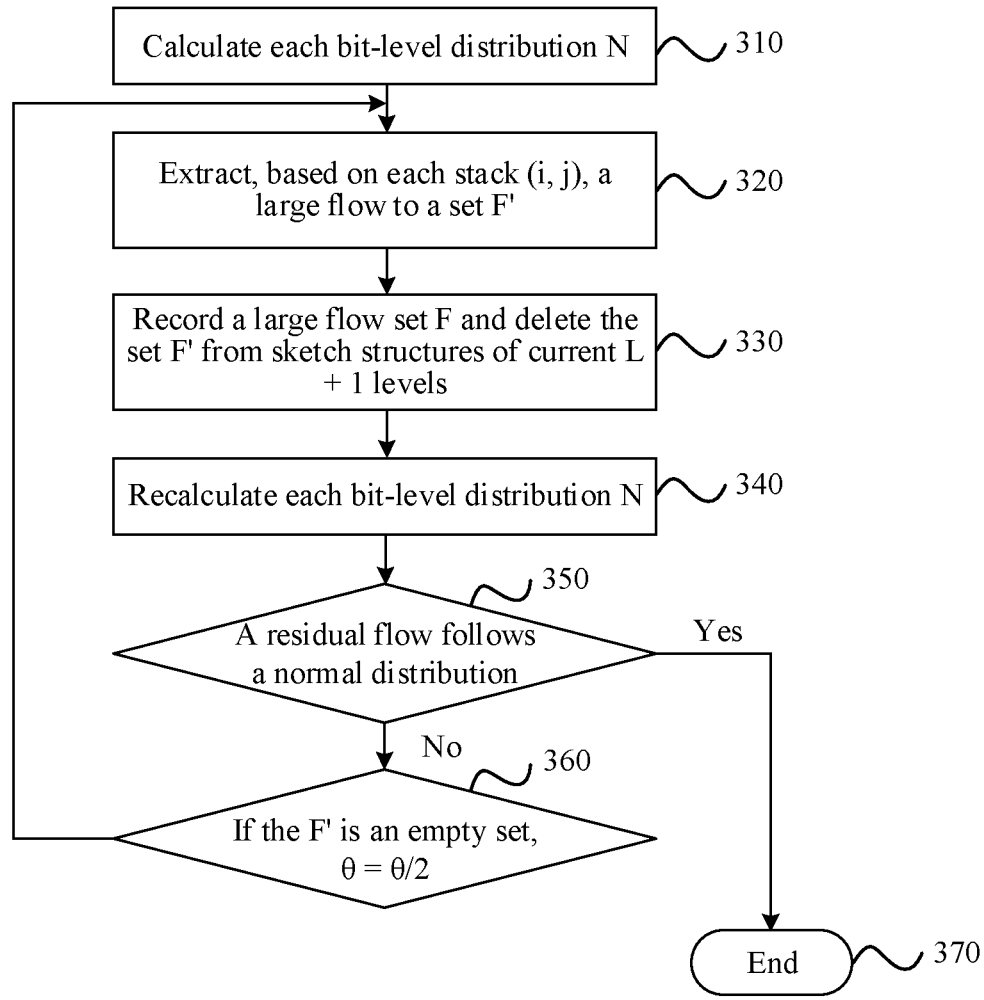
FIG. 7 is a schematic diagram of performing a network traffic measurement method by a control plane device according to an embodiment of this application.

FIG. 7 is a schematic diagram of performing a network traffic measurement method by a control panel device according to an embodiment of this application.

The network traffic measurement method in FIG. 7 may be performed by a control plane device in a system, for example, the control plane device 101 in FIG. 4. The method includes the following steps.

S310. Calculate each bit-level distribution probability.

For example, the control plane device calculates, in each sketch (1 to L), an average value and a variance.

S320. Extract, based on each stack (i, j), a large flow to a set F'.

S330. Record a large flow set F and delete the set F' from data structures of current L+1 levels.

S340. Recalculate each bit-level distribution characteristic N.

For example, based on deleting a large flow, deletion is performed on the stack (i, j), and the bit-level distribution is recalculated.

S350. Determine whether a residual flow obtained after the large flow is deleted follows a normal distribution. If the residual flow follows a normal distribution, perform S370 to output the large flow set F, a data structure of the residual flow, and the bit-level-based distribution N, or if the residual flow does not follow a normal distribution, perform S360.

S360. Determine whether the set F' is an empty set, and if the set F' is an empty set, adjust a threshold θ.

For example, if the residual flow does not follow the normal distribution, it is determined whether the set F' is an empty set. If the set F' is an empty set, the threshold θ is adjusted, and S320 proceeds.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

FIG. 7 is the flowchart of the foregoing steps. The following describes a pseudocode implementation for performing an algorithm shown in FIG. 7.

Algorithm 1 model inference (algorithm 1 model inference)

Input: Multi-level sketch S={$V_{i,j[k]}$|0≤k≤L, 1≤i≤r, 1≤j≤c}
1: Large flow list F=Ø;
2: θ=½;
3: Bit-level counter distributions {N(p[k], σ²[k])}=Computers Dist(S)
4: while true do
5: set of extracted large flows F'=Ø;
6: for all stack(i,j), 1≤i≤r, 1≤j≤c do;
7: F'=F'∪ExtractLagerFlows (θ, (i,j),S, {N(p[k], σ²[k])});
8: F=F∪F';
9: RemoveFlows(S, F');
10: {N(p[k], σ²[k])}=Computers Dist(S);
11: if Terminate ({N(p[k], σ²[k])}) then;
12: break;
13: if F'==Ø then;
14: θ=θ/2.

The foregoing code is pseudocode that may be used to perform the flowchart shown in FIG. 7.

Step S330, in FIG. 7, of a procedure for extracting, based on each stack (i, j), a large flow to a set F' is shown in FIG. 8. FIG. 8 is a schematic diagram of an algorithm for extracting a large flow from a stack according to an embodiment of this application. According to a procedure shown in FIG. 8, a control plane device may extract, to a first set, a large flow from r*c stacks of first data.

S410. Obtain, according to a maximum likelihood estimation algorithm by using data in a data structure, a probability $\dot{P}[k]$ of a value being 1 corresponding to each bit in a stack (i, j).

For example, it is assumed that, $$R_{i,j[k]}=V_{i,j[k]}/V_{i,j[0]},$$

where k belongs to [1 . . . L], and $R_{ij[k]}$ represents a ratio of a frequency value recorded in a sketch of a level k in the stack (i, j) obtained before the large flow is extracted to a frequency value in a level 0.

If $R_{i,j[k]}$<θ, there is no large flow record in a corresponding $k^{th}$ bit, and $\dot{P}[k]$=0.

If 1−$R_{i,j[k]}$<θ, it is estimated that $\dot{P}[k]$=1.

If neither of the foregoing conditions is met, that is, $R_{i,j[k]}$>θ and 1−$R_{i,j[k]}$>θ, assuming that there is a large flow whose $k^{th}$ bit is 1, after a record of the large flow is removed from a sketch[k], an approximation relationship between remaining $R_{i,j[k]}$ and p[k] is observed, and $\dot{P}[k]$ may be calculated according to a Bayes' theorem.

S420. Construct a flow keyword of a candidate large flow by using a per-bit probability, and check correctness by using a hash function.

For example, based on $\dot{P}[k]$>θ or 1−$\dot{P}[k]$>θ (for example, θ is 0.99), it is estimated that a value of a $k^{th}$ bit is either 1 or 0. If neither of the foregoing conditions is met, it indicates that a value of the $k^{th}$ bit may be 1 or 0.

All possible flowkeys are constructed based on obtained $\dot{P}[k]$, and the flowkeys are checked by using an original hash function, to ensure that $h_i$(flowkey)=j, where (i,j) is a stack (i,j).

S430. Estimate a frequency of the corresponding flow keyword by using a relationship of impact that is made on an average value by a large flow.

For example, after a large flow f is removed from a sketch S, assuming that a frequency of the large flow is $S_f$, impact made on an average value p[k] may be expressed by using the following equation.

If a value of the $k^{th}$ bit is 1, $$p[k] = \frac{V_{i,j[k]} - s_f}{V_{i,j[0]} - s_f}.$$

If a value of the $k^{th}$ bit is 0, $$p[k] = \frac{V_{i,j[k]}}{V_{i,j[0]} - s_f}.$$

The frequency of the large flow $S_f$ based on each bit may be calculated according to the foregoing equation.

If a value of the $k^{th}$ bit is 1, $$s_f = V_{i,j[0]} \frac{R_{i,j[k]} - p[k]}{1 - p[k]}.$$

If a value of the $k^{th}$ bit is 0, $$s_f = V_{i,j[0]} \left(1 - \frac{R_{i,j[k]}}{p[k]}\right).$$

Based on the foregoing frequency $S_f$ of the large flow based on each bit, by using an average frequency value of each bit, a frequency of the large flow f is obtained.

S440. Record $\hat{P}[k]$ as a bit-level deterministic probability for constructing the flow keyword of the candidate large flow, and perform filtering.

For example, if f[k]=1, $\hat{P}[k]$ is recorded as the deterministic probability.

If f[k]=0, $1-\hat{P}[k]$ is recorded as the deterministic probability. In this way, if deterministic probabilities corresponding to most bits of a flowkey is close to 1, this flowkey is probably to be a flowkey of a large flow that is being looked for.

For example, a flowkey whose deterministic probabilities corresponding to 50% bits are greater than 90% is selected through filtering, and other flowkeys are discarded.

S450. Perform frequency check on the flow keyword by using another hash function.

For example, each sketch has r hash tables, and for a large flow set C obtained from (i, j), another hash is used to check whether a large flow condition is met. If another hash to stack (s,t) s is not i, for any k meeting k∈[1 . . . L] and $V_{s,t[k]} < \theta$, $V_{i,j[0]}$ does not pass the check and a corresponding flow is removed from the large flow set C.

According to the procedures shown in FIG. 7 and FIG. 8, the control plane device may obtain classified flow data.

For example, the control plane device may obtain the following information a large flow table in which a flowkey of a large flow and a corresponding frequency are recorded, a record of a data structure of a residual flow, where the data structure is similar to a structure of the multi-level sketch shown in FIG. 6 except that impact of the large flow is eliminated from the data structure, and a bit-level distribution of $R_{i,j[k]}$.

A plurality of types of flows may be flexibly queried based on the foregoing three types of data.

For example, a large flow is queried. Based on a large flow threshold $T_h$, a large flow may be directly determined from a large flow table and output.

For example, a frequency of an arbitrary flow may be queried. A query may be first performed in a large flow table. If no result is found, it indicates that the arbitrary flow is a small flow, and a query may be performed on a residual sketch by using a forward hash.

For example, a flow burst may be queried. Data of two periods is recorded, a query is performed in a large flow table, and a per-flow-frequency query is performed on data of the other period.

For example, a flow distribution is queried. A flow distribution is obtained according to a model reference adaptive control (MRAC) algorithm by using residual sketch data, and flow entropy may be further calculated by using flow distribution data.

For example, a flow quantity is queried according to the following equation.

According to Theorem 1 and equation n=(p[k](1−p[k])c/($\sigma^2$[k])), the flow quantity may be obtained by using flow distribution data. In addition, a quantity of large flows needs to be added.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the network flow measurement method according to the embodiments of this application. In this application, the network measurement device may perform measurement based on the bit-level keyword of the flow, and record the measurement information. The control plane device obtains the statistical result based on the measurement information reported by the network device, so that a plurality of types of flows may be flexibly queried. It should be understood that the network measurement device and the control plane device in the embodiments of this application may perform the methods in the foregoing embodiments of this application. Therefore, for a specific working process of the following products, refer to the corresponding process in the foregoing method embodiments.

Figure 9:
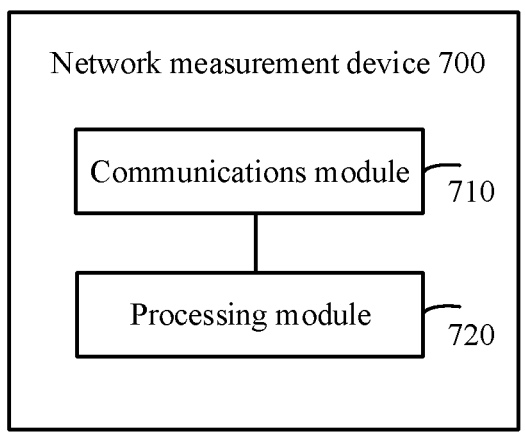
FIG. 9 is a schematic block diagram of a network measurement device according to an embodiment of this application.

FIG. 9 is a schematic block diagram of a network measurement device 700 according to an embodiment of this application (the network measurement device in FIG. 9 may be any node in FIG. 4). The network measurement device 700 may correspond to the network measurement device in the method embodiments, and may have any function of the network measurement device in the method.

As shown in FIG. 9, the network measurement device 700 includes a communications module 710 and a processing module 720.

The processing module 720 is configured to measure first data, where the first data includes a first-type data structure, the first-type data structure includes first measurement information of a flow, and the first measurement information corresponds to a bit of a keyword of the flow.

The communications module 710 is configured to send the first data to the control plane device.

In this embodiment of this application, the network measurement device measures flow data by using the first-type data structure that is included in the first data and that corresponds to a bit level of the keyword of the flow, and reports, to the control plane device, measurement information recorded based on the first data. The control plane device obtains a statistical result based on a probability distribution characteristic of the first data. In this way, measurement of various types of target traffic, such as a large flow, a flow of any size, and a flow burst, can be supported based on a common measurement method, without being affected by a flow distribution, thereby implementing application of using a single sensor to support comparatively wide network flow measurement.

Optionally, the first-type data structure includes measurement information corresponding to at least one bit of the keyword of the flow.

Optionally, the first data further includes a second-type data structure, the second-type data structure includes second measurement information of the flow, and the second measurement information corresponds to the keyword of the flow.

Optionally, the first measurement information corresponds to each bit of the keyword of the flow.

Optionally, the first-type data structure includes measurement information corresponding to each bit of the keyword of the flow.

Optionally, the first-type data structure is K first data unit matrices. Each first data unit matrix is used to record the first measurement information based on a value of one bit of the keyword of the flow. The second-type data structure is a second data unit matrix. The second data unit matrix is used to record the second measurement information. K is a positive integer greater than or equal to 1.

It should be understood that each of the K first data unit matrices corresponds to one bit of the keyword of the flow.

For example, when a keyword of a flow has four bits, there are four first data unit matrices corresponding to the keyword of the flow. To be specific, a first bit of the keyword corresponds to a $1^{st}$ first data unit matrix, a second bit of the keyword corresponds to a $2^{nd}$ first data unit matrix, a third bit corresponds to a $3^{rd}$ first data unit matrix, and a fourth bit corresponds to a $4^{th}$ first data unit matrix.

Optionally, the processing module 720 is specifically configured to record the second measurement information of a first flow in an $M_{ij}$ in the second data unit matrix, where the $M_{ij}$ represents a data unit in an $i^{th}$ row and a $j^{th}$ column, i is a positive integer less than or equal to r, j is a positive integer less than or equal to c, and the second measurement information includes at least one of a packet quantity or a packet length of the first flow, and when a value of an $N^{th}$ bit of the keyword of the first flow is a preset value, record the first measurement information of the first flow in an $M_{ij}$ in an $N^{th}$ data unit matrix of the first-type data structure, where the first measurement information includes at least one of the packet quantity or the packet length of the first flow, N is less than or equal to K, and both K and N are positive integers.

For example, the first measurement information and the second measurement information may be statistical values.

For example, the processing module 720 is specifically configured to, when a value of an $N^{th}$ bit of the keyword of the first flow is 1, record a statistical value of the first flow in an $M_{ij}$ in an $N^{th}$ data unit matrix of the first-type data structure, where N is less than or equal to K, and both K and N are positive integers.

For example, the processing module 720 is specifically configured to, when a value of an $N^{th}$ bit of the keyword of the first flow is 0, record a statistical value of the first flow in an $M_{ij}$ in an $N^{th}$ data unit matrix of the first-type data structure, where N is less than or equal to K, and both K and N are positive integers.

Optionally, there is a mapping relationship between the first flow and the $M_{ij}$, and the mapping relationship is:

$h_i(key)=j$, where $h_i( )$ represents an $i^{th}$ hash function, and key represents the keyword corresponding to the first flow.

It should be noted that the processing module of the network measurement device may be a multi-sketch processing unit, and a multi-sketch may be a record obtained by performing information measurement based on the data structure shown in FIG. 6. The communications module may be, for example, a function implemented on a software device, or an algorithm unit on a hardware device, and is configured to send, to a control plane, a data structure recorded by the multi-sketch.

Figure 10:
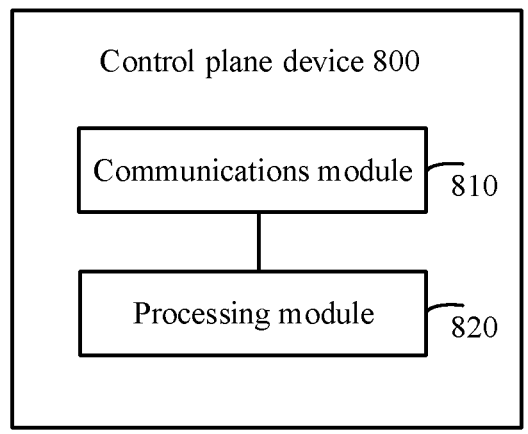
FIG. 10 is a schematic block diagram of a control plane device according to an embodiment of this application.

FIG. 10 is a schematic block diagram of a control plane device 800 according to an embodiment of this application (the control plane device 800 in FIG. 8 may be the control plane device in FIG. 4). The control plane device 800 may correspond to the control plane device in the method embodiments, and may have any function of the control plane device in the method.

As shown in FIG. 10, the control plane device 800 includes a communications module 810 and a processing module 820.

The communications module 810 is configured to obtain first data reported by the network measurement device, where the first data includes a first-type data structure, the first-type data structure includes first measurement information of a flow, and the first measurement information corresponds to a bit of a keyword of the flow.

The processing module 820 is configured to obtain a statistical result based on the first data.

In this embodiment of this application, the control plane device receives measurement information reported by the network measurement device. The network measurement device measures flow data by using the first-type data structure that is included in the first data and that corresponds to a bit level of the keyword of the flow, and reports, to the control plane device, the measurement information recorded based on the first data. The control plane device obtains the statistical result based on a probability distribution characteristic of the first data. In this way, measurement of various types of target traffic, such as a large flow, a flow of any size, and a flow burst, can be supported based on a common measurement method, without being affected by a flow distribution, thereby implementing application of using a single sensor to support comparatively wide network flow measurement.

Optionally, the first-type data structure includes measurement information corresponding to at least one bit of the keyword of the flow.

Optionally, the first data further includes a second-type data structure, the second-type data structure includes second measurement information of the flow, and the second measurement information corresponds to the keyword of the flow.

Optionally, the first-type data structure includes measurement information corresponding to each bit of the keyword of the flow.

Optionally, the first measurement information corresponds to each bit of the keyword of the flow.

Optionally, the first-type data structure is K first data unit matrices. Each first data unit is used to record the first measurement information based on a value of one bit of the keyword of the flow. The second-type data structure is a second data unit matrix. The second data unit matrix is used to record the second measurement information. K is a positive integer greater than or equal to 1.

It should be understood that each of the K first data unit matrices corresponds to one bit of the keyword of the flow.

For example, when a keyword of a flow has four bits, there are four first data unit matrices corresponding to the keyword of the flow. To be specific, a first bit of the keyword corresponds to a $1^{st}$ first data unit matrix, a second bit of the keyword corresponds to a $2^{nd}$ first data unit matrix, a third bit corresponds to a $3^{rd}$ first data unit matrix, and a fourth bit corresponds to a $4^{th}$ first data unit matrix.

Optionally, an $M_{ij}$ in the second-type data structure is used to record the second measurement information of a first flow, where the $M_{ij}$ represents a data unit in an $i^{th}$ row and a $j^{th}$ column, i is a positive integer less than or equal to r, j is a positive integer less than or equal to c, and the second measurement information includes at least one of a packet quantity or a packet length of the first flow.

The first-type data structure is the K first data unit matrices, where an $M_{ij}$ in an $N^{th}$ data unit matrix is used to, when a value of an $N^{th}$ bit of the keyword of the first flow is a preset value, record the first measurement information of the first flow. The second measurement information includes at least one of the packet quantity or the packet length of the first flow. N is less than or equal to K, and N is a positive integer.

For example, the first measurement information and the second measurement information may be statistical values.

Optionally, an $M_{ij}$ in the second-type data structure is used to record a statistical value of the first flow, where the $M_{ij}$ represents a data unit in an $i^{th}$ row and a $j^{th}$ column, i is a positive integer less than or equal to r, j is a positive integer less than or equal to c, and the statistical value includes at least one of a packet quantity or a packet length. The first-type data structure is the K first data unit matrices, where an $M_{ij}$ in an $N^{th}$ data unit matrix is used to, when a value of an $N^{th}$ bit of the keyword of the first flow is a preset value, record a statistical value of the first flow, N is less than or equal to K, and both K and N are positive integers.

For example, the first-type data structure is the K first data unit matrices, where an $M_{ij}$ in an $N^{th}$ data unit matrix is used to, when a value of an $N^{th}$ bit of the keyword of the first flow is 1, record a statistical value of the first flow, N is less than or equal to K, and both K and N are positive integers.

For example, the first-type data structure is the K first data unit matrices, where an $M_{ij}$ in an $N^{th}$ data unit matrix is used to, when a value of an $N^{th}$ bit of the keyword of the first flow is 0, record a statistical value of the first flow, N is less than or equal to K, and both K and N are positive integers.

Optionally, there is a mapping relationship between the first flow and the $M_{ij}$, and the mapping relationship is:

$$h_i(key)=j,$$

where $h_i( )$ represents an $i^{th}$ hash function, and key represents the keyword corresponding to the first flow.

Optionally, the processing module 820 is specifically configured to obtain, based on a per-bit distribution characteristic of the keyword, a first set and updated first data, where the first set includes a large flow extracted from r*c stacks stack of the first data, the updated first data includes all data units corresponding to a residual flow that is in the r*c stacks stack other than the first set, and any one of the r*c stacks is a data unit group including data units in same rows and same columns of K+1 data unit matrices.

Optionally, the processing module 820 is specifically configured to extract a large flow from a first stack of the r*c stacks stack, where the first set includes the large flow extracted from the first stack, the updated first data includes all data units corresponding to a residual flow, other than the large flow extracted from the first stack, in the r*c stacks stack.

Optionally, if the updated first data follows a normal distribution, the processing module 820 is further configured to determine that the first set includes all large flows that are in the first data.

Optionally, if the updated first data does not follow a normal distribution, the processing module 820 is further configured to extract a large flow from the r*c stacks stack of the first data.

Optionally, if the first set is an empty set, the processing module 820 is specifically configured to extract a large flow from the r*c stacks stack of the first data after adjusting a threshold. The threshold is a ratio of large flow traffic to total traffic, or a ratio of a large flow frequency to a total traffic frequency.

Optionally, the processing module 820 is specifically configured to obtain a probability of a value being 1 corresponding to each bit in the r*c stacks stack, determine a third set based on the probability, where the third set includes a candidate keyword of the large flow, and determine a keyword of the large flow based on the third set.

Optionally, the processing module 820 is specifically configured to determine K frequencies based on a per-bit ratio of a stack of the first-type data structure to a same stack of the second-type data structure, to calculate a frequency of at least one keyword included in the third set, perform filtering on the at least one keyword based on a per-bit deterministic probability, to determine the keyword of the large flow, and perform frequency check on the keyword of the large flow according to a hash function.

Optionally, the statistical result includes at least one of a large flow list in the first data, data of a residual flow that is in the first data and that is other than a large flow, or a per-bit flow data frequency distribution in the first data.

Optionally, the communications module 810 is further configured to receive, for the control plane device, a traffic query request, and the processing module 820 is further configured to send a query result based on the traffic query request.

Figure 11:
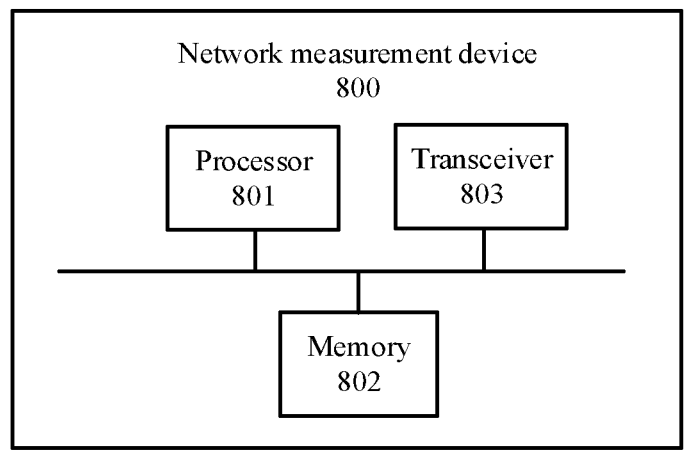
FIG. 11 is a schematic block diagram of a network measurement device according to another embodiment of this application.

FIG. 11 is a block diagram of a structure of a network measurement device according to an embodiment of this application. As shown in FIG. 11, the network measurement device includes a processor 801, a memory 802, and a transceiver 803. The processor 801 may be configured to process flow data, control the network measurement device, execute a software program, process data of the software program, and the like. The memory 802 is mainly configured to store a software program and data.

When flow data needs to be sent, the processor 801 processes the to-be-sent flow data, and then outputs processed flow data to the transceiver 803. When flow data is sent to the network device, the transceiver 803 receives the flow data and outputs the data to the processor, and the processor processes the flow data. For ease of description, FIG. 8 shows only one memory and one processor. An actual network device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit with a transceiver function may be considered as the transceiver 803 of the network device, and a processor with a processing function may be considered as the processing module 720 of the network measurement device. The transceiver may also be referred to as a transceiver module 710, a transceiver machine, a transceiver apparatus, or the like. The processing module may also be referred to as a processor, a processing board, a processing module, a processing apparatus, or the like.

Optionally, a component that is in the transceiver 803 and that is configured to implement a receiving function may be considered as a receiving unit, and a component that is in the transceiver 803 and that is configured to implement a sending function may be considered as a sending unit. That is, the transceiver 803 includes the receiving unit and the sending unit. The receiving unit sometimes may also be referred to as a receiver machine, a receiver, a receiver circuit, or the like. The sending unit sometimes may also be referred to as a transmitter machine, a transmitter, a transmitter circuit, or the like.

The processor 801, the memory 802, and the transceiver 803 communicate with each other by using an internal connection path, to transmit a control signal and/or a data signal.

The method disclosed in the foregoing embodiments of this application may be applied to the processor 801 or may be implemented by the processor 801. The processor 801 may be an integrated circuit chip and has a signal processing capability. In an implementation process, steps in the foregoing methods can be implemented by using a hardware integrated logic circuit in the processor 801, or by using instructions in a form of software.

The processor described in the embodiments of this application may be a general-purpose processor, a digital signal processor (DSP), an application-specific integrated circuit (ASIC), a field-programmable gate array (FPGA), or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random-access memory (RAM), a flash memory, a read-only memory (ROM), a programmable ROM, an electrically erasable programmable memory, a register. The storage medium is located in the memory, and a processor reads instructions in the memory and completes the steps in the foregoing methods in combination with hardware of the processor.

Optionally, in some embodiments, the memory 802 may store an instruction for performing the method performed by the network measurement device in the method shown in FIG. 5. The processor 801 may execute the instruction stored in the memory 802 to complete, in combination with another piece of hardware (such as the transceiver 803), the step performed by the network measurement device in the method shown in FIG. 5. For a specific working process and beneficial effects, refer to the descriptions in the embodiment shown in FIG. 5.

An embodiment of this application further provides a chip. The chip includes a transceiver unit and a processing unit. The transceiver unit may be an input/output circuit or a communications interface. The processing unit is a processor, a microprocessor, or an integrated circuit that is integrated on the chip. The chip may perform the method for the network measurement device in the method embodiment shown in FIG. 5.

An embodiment of this application further provides a computer program product including an instruction. When the instruction is executed, the method for the network measurement device in the method embodiment shown in FIG. 4 is implemented.

An embodiment of this application further provides a computer readable storage medium. The computer readable storage medium stores an instruction. When the instruction is executed, the method for the network measurement device in the method embodiment shown in FIG. 5 is implemented.

Figure 12:
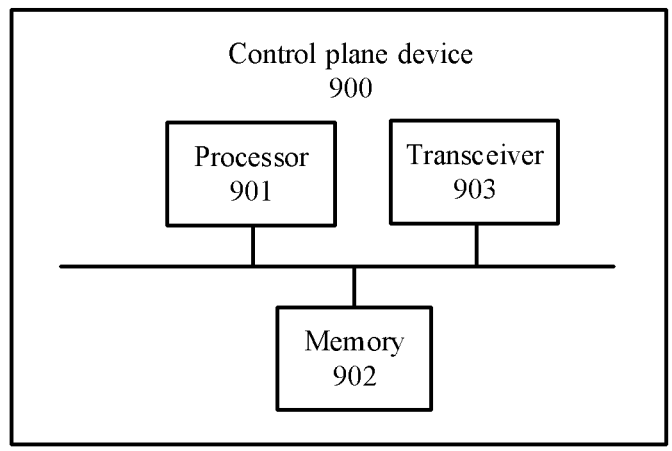
FIG. 12 is a schematic block diagram of a control plane device according to another embodiment of this application.

FIG. 12 is a block diagram of a structure of a control plane device according to an embodiment of this application. As shown in FIG. 12, the control plane device includes a processor 901, a memory 902, and a transceiver 903. The processor 901 may be configured to process flow data, control the network measurement device, execute a software program, process data of the software program, and the like. The memory 902 is mainly configured to store a software program and data.

When flow data needs to be sent, the processor 901 processes the to-be-sent flow data, and then outputs processed flow data to the transceiver 903. When flow data is sent to the network device, the transceiver 903 receives the flow data and outputs the data to the processor, and the processor processes the flow data. For ease of description, FIG. 12 shows only one memory and one processor. An actual network device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit with a transceiver function may be considered as the transceiver 903 of the network device, and a processor with a processing function may be considered as the processing module 820 of the control plane device. The transceiver may also be referred to as a communications module 810, a transceiver machine, a transceiver apparatus, or the like. The processing module may also be referred to as a processor, a processing board, a processing module, a processing apparatus, or the like.

Optionally, a component that is in the transceiver 903 and that is configured to implement a receiving function may be considered as a receiving unit, and a component that is in the transceiver 903 and that is configured to implement a sending function may be considered as a sending unit. That is, the transceiver 903 includes the receiving unit and the sending unit. The receiving unit sometimes may also be referred to as a receiver machine, a receiver, a receiver circuit, or the like. The sending unit sometimes may also be referred to as a transmitter machine, a transmitter, a transmitter circuit, or the like.

The processor 901, the memory 902, and the transceiver 903 communicate with each other by using an internal connection path, to transmit a control signal and/or a data signal.

The method disclosed in the foregoing embodiments of this application may be applied to the processor 901 or may be implemented by the processor 901. The processor 901 may be an integrated circuit chip and has a signal processing capability. In an implementation process, steps in the foregoing methods can be implemented by using a hardware integrated logic circuit in the processor 901, or by using instructions in a form of software.

The processor described in the embodiments of this application may be a general-purpose processor, a DSP, an ASIC, an FPGA, or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a RAM, a flash memory, a ROM, a programmable ROM, an electrically erasable programmable memory, a register. The storage medium is located in the memory, and a processor reads instructions in the memory and completes the steps in the foregoing methods in combination with hardware of the processor.

Optionally, in some embodiments, the memory 902 may store an instruction for performing the method performed by the control plane device in the method shown in FIG. 5. The processor 901 may execute the instruction stored in the memory 902 to complete, in combination with another piece of hardware (such as the transceiver 903), the step performed by the control plane device in the method shown in FIG. 5. For a specific working process and beneficial effects, refer to the descriptions in the embodiment shown in FIG. 5.

An embodiment of this application further provides a chip. The chip includes a transceiver unit and a processing unit. The transceiver unit may be an input/output circuit or a communications interface. The processing unit is a processor, a microprocessor, or an integrated circuit that is integrated on the chip. The chip may perform the method for the control plane device in the method embodiment shown in FIG. 5.

An embodiment of this application further provides a computer program product including an instruction. When the instruction is executed, the method for the control plane device in the method embodiment shown in FIG. 5 is implemented.

An embodiment of this application further provides a computer readable storage medium. The computer readable storage medium stores an instruction. When the instruction is executed, the method for the control plane device in the method embodiment shown in FIG. 5 is implemented.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network flow measurement method implemented by a network measurement device of a system, wherein the network flow measurement method comprises:
    measuring data comprising a first-type data structure and a second-type data structure, wherein the first-type data structure comprises first measurement information of a first flow, wherein the first measurement information of the first flow corresponds to one of a plurality of bits of a first keyword of the first flow, wherein the first measurement information of the first flow comprises at least one of a first packet quantity or a first packet length of the first flow, wherein the second-type data structure comprises second measurement information of the first flow, wherein the second measurement information of the first flow corresponds to the first keyword, wherein the first-type data structure is a plurality of data unit matrices, wherein each of the data unit matrices records the first measurement information of the first flow based on a first value of one of the bits of the first keyword, wherein the second-type data structure is a first data unit matrix, and wherein the first data unit matrix records the second measurement information of the first flow; and sending the data to a control plane device of the system.

2. The network flow measurement method of claim 1, wherein a quantity of the data unit matrices equals a number of bits in the first keyword.

3. The network flow measurement method of claim 1, wherein the first measurement information corresponds to each of the bits.

4. The network flow measurement method of claim 2, wherein a first of the data unit matrices includes a first data unit mapped to a first bit of bits, wherein the first measurement information comprises the first packet quantity, and wherein the network flow measurement method further comprises:

determining whether a value of the first bit is 0 or 1; and
incrementing a value in the first data unit by 1 when the value is 1.

5. The network flow measurement method of claim 1, further comprising:

recording the second measurement information of a second flow in a first data unit in the first data unit matrix, wherein the second measurement information of the second flow comprises at least one of a second packet quantity or a second packet length of the second flow; and recording the first measurement information of the second flow in a second data unit in a second data unit matrix of the first-type data structure when a second value of a bit of a second keyword of the second flow is a preset value, wherein the first measurement information of the second flow comprises at least one of the second packet quantity or the second packet length of the second flow.

6. The network flow measurement method of claim 5, wherein there is a mapping relationship between the second flow and the first data unit, wherein the mapping relationship is according to the following:

$$hi(\text{key})=j,$$

wherein hi( ) represents an ith hash function, and wherein key represents the second keyword.

7. A network flow measurement method implemented by a control plane device of a system, wherein the network flow measurement method comprises:

obtaining data from a network measurement device of the system, wherein the data comprises a first-type data structure comprising first measurement information of a first flow, wherein the first measurement information of the first flow corresponds to one of a plurality of bits of a first keyword of the first flow, wherein the first measurement information of the first flow comprises at least one of a first packet quantity or a first packet length of the first flow, wherein the data further comprises a second-type data structure comprising second measurement information of the first flow, wherein the second measurement information of the first flow corresponds to the first keyword, wherein the first-type data structure is a first plurality of data unit matrices, wherein each of the first data unit matrices records the first measurement information of the first flow based on a first value of one of the bits, wherein the second-type data structure is a first data unit matrix, and wherein the first data unit matrix records the second measurement information of the first flow; and obtaining a statistical result based on the data.

8. The network flow measurement method of claim 7, wherein a quantity of the data unit matrices equals a number of bits in the first keyword.

9. The network flow measurement method of claim 7, wherein the first measurement information corresponds to each of the bits.

10. The network flow measurement method of claim 8, wherein a first of the data unit matrices includes a first data unit mapped to a first bit of bits, wherein the first measurement information comprises the first packet quantity, and wherein the network flow measurement method further comprises:

determining whether a value of the first bit is 0 or 1; and
incrementing a value in the first data unit by 1 when the value is 1.

11. The network flow measurement method of claim 7, wherein a first data unit in the second-type data structure records the second measurement information of a second flow, wherein the second measurement information of the second flow comprises at least one of a second packet quantity or a second packet length of the second flow, wherein a second data unit in a second data unit matrix records the first measurement information of the second flow when a second value of a bit of a second keyword of the second flow is a preset value, and wherein the first measurement information of the second flow comprises at least one of the second packet quantity or the second packet length of the second flow.

12. The network flow measurement method of claim 11, wherein there is a mapping relationship between the second flow and the first data unit, wherein the mapping relationship is according to the following:

$$hi(\text{key})=j,$$

wherein hi( ) represents an ith hash function, and wherein key represents the second keyword.

13. The network flow measurement method of claim 10, wherein obtaining the statistical result comprises obtaining a first set and updated data based on a per-bit distribution characteristic of the first keyword, wherein the first set comprises a first large flow extracted from a plurality of stacks of the data, wherein the updated data comprises all data units corresponding to a first residual flow that is in the stacks other than the first set, and wherein any one of the stacks is a data unit group comprising data units in same rows and same columns of a second plurality of data unit matrices.

14. The network flow measurement method of claim 13, wherein obtaining the first set and the updated data comprises extracting a second large flow from a first stack of the stacks, wherein the first set comprises the second large flow, and wherein the updated data comprises all data units corresponding to a second residual flow in the stacks other than the second large flow.

15. The network flow measurement method of claim 13, further comprising:

determining that the first set comprises all large flows that are in the data when the updated data follows a normal distribution; or extracting the first large flow when the updated data does not follow the normal distribution.

16. A network measurement device comprising:

a processor configured to measure data comprising a first-type data structure and a second-type data structure, wherein the first-type data structure comprises first measurement information of a first flow, wherein the first measurement information of the first flow corresponds to one of a plurality of bits of a first keyword of the first flow, wherein the first measurement information of the first flow comprises at least one of a first packet quantity or a first packet length of the first flow, wherein the second-type data structure comprises second measurement information of the first flow, wherein the second measurement information of the first flow corresponds to the first keyword, wherein the first-type data structure is a plurality of data unit matrices, wherein each of the data unit matrices records the first measurement information of the first flow based on a first value of one of the bits, wherein the second-type data structure is a first data unit matrix, and wherein the first data unit matrix records the second measurement information of the first flow; and a communications system coupled to the processor and configured to send the data to a control plane device.

17. The network measurement device of claim 16, wherein a quantity of the data unit matrices equals a number of bits in the first keyword.

18. The network measurement device of claim 16, wherein the first measurement information corresponds to each of the bits.

19. The network measurement device of claim 17, wherein a first of the data unit matrices includes a first data unit mapped to a first bit of bits, wherein the first measurement information comprises the first packet quantity, and wherein the processor is further configured to:

determine whether a value of the first bit is 0 or 1; and
increment a value in the first data unit by 1 when the value is 1.

20. The network measurement device of claim 16, wherein the processor is further configured to:

record the second measurement information of a second flow in a first data unit in the first data unit matrix, wherein the second measurement information of the second flow comprises at least one of a second packet quantity or a second packet length of the second flow; and record the first measurement information of the second flow in a second data unit in a second data unit matrix of the first-type data structure when a second value of a bit of a second keyword of the second flow is a preset value, wherein the first measurement information of the second flow comprises at least one of the second packet quantity or the second packet length of the second flow.

* * * * *